(12) United States Patent
McAndrews et al.

(10) Patent No.: US 10,150,526 B2
(45) Date of Patent: Dec. 11, 2018

(54) BICYCLE SADDLE POST SUSPENSION

(71) Applicant: SPECIALIZED BICYCLE COMPONENTS, INC., Morgan Hill, CA (US)

(72) Inventors: Michael McAndrews, Capitola, CA (US); Brian Lampman, Aptos, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 250 days.

(21) Appl. No.: 14/885,067

(22) Filed: Oct. 16, 2015

(65) Prior Publication Data

US 2017/0106927 A1    Apr. 20, 2017

(51) Int. Cl.
| | |
|---|---|
| *B62J 1/06* | (2006.01) |
| *B62J 1/08* | (2006.01) |
| *F16F 13/00* | (2006.01) |
| *F16F 15/02* | (2006.01) |

(52) U.S. Cl.
CPC . *B62J 1/06* (2013.01); *B62J 1/08* (2013.01); *F16F 13/002* (2013.01); *F16F 15/022* (2013.01)

(58) Field of Classification Search
CPC ..................................... B62J 1/06; B62J 1/08
See application file for complete search history.

(56) References Cited

U.S. PATENT DOCUMENTS

| | | | |
|---|---|---|---|
| 5,044,648 A * | 9/1991 | Knapp | B62J 1/06 188/322.17 |
| 5,094,424 A | 3/1992 | Hartway | |
| 5,301,974 A * | 4/1994 | Knapp | B62J 1/06 188/322.17 |
| 5,829,733 A | 11/1998 | Becker | |
| 5,855,363 A | 1/1999 | Svendsen | |
| 5,921,572 A | 7/1999 | Bard et al. | |
| 6,070,895 A | 6/2000 | Newman et al. | |
| 6,095,541 A * | 8/2000 | Turner | B62K 25/08 188/322.22 |
| 6,105,987 A | 8/2000 | Turner | |
| 6,135,434 A | 10/2000 | Marking | |
| 6,176,476 B1 | 1/2001 | Wang | |
| 6,349,957 B2 | 2/2002 | Smith | |
| 6,581,919 B2 | 6/2003 | Barefoot et al. | |
| 6,938,887 B2 | 9/2005 | Achenbach | |
| 7,025,367 B2 | 4/2006 | McKinnon | |
| 8,398,104 B2 | 3/2013 | Hsu | |
| 8,480,064 B2 | 7/2013 | Talavasek | |
| 8,511,655 B2 | 8/2013 | Wu | |
| 2003/0034596 A1* | 2/2003 | Barefoot | B62J 1/06 267/131 |

(Continued)

*Primary Examiner* — Joseph M Rocca
*Assistant Examiner* — Maurice L Williams
(74) *Attorney, Agent, or Firm* — Knobbe Martens Olson & Bear LLP

(57) ABSTRACT

A bicycle saddle suspension assembly comprises a body configured to couple to a bicycle frame; a saddle support mechanism configured to couple to a bicycle saddle; a suspension spring that biases the saddle support mechanism in a first direction with respect to the body; and a damping apparatus configured to damp motion of the saddle support mechanism with respect to the body, the damping apparatus configured to reduce a level of damping responsive to a terrain-induced force.

41 Claims, 14 Drawing Sheets

(56) References Cited

U.S. PATENT DOCUMENTS

| | | | | |
|---|---|---|---|---|
| 2013/0221713 A1* | 8/2013 | Pelot | ............................ | B62J 1/02 |
| | | | | 297/215.13 |
| 2015/0197308 A1* | 7/2015 | Butora | .................... | B62K 25/10 |
| | | | | 280/283 |
| 2016/0355225 A1* | 12/2016 | Shirai | ......................... | B62J 1/06 |
| 2017/0096185 A1* | 4/2017 | Hara | ............................ | B62J 1/08 |

* cited by examiner

BICYCLE SADDLE POST SUSPENSION

TECHNICAL FIELD

The present technology relates to bicycles and, in particular, saddle post suspension systems.

DESCRIPTION OF THE RELATED TECHNOLOGY

For many years bicycles were constructed using a rigid frame design. Such a design relies on pressurized tires and a certain amount of natural flexibility of the frame to absorb impacts, such as bumps experienced while riding a bicycle on a road or trail. In certain situations, however, it can be advantageous to incorporate additional suspension components to more effectively absorb bumps, especially bumps of greater magnitude. One example of a bicycle suspension system comprises a saddle suspension system. In such a system, a spring functionally positioned between a bicycle saddle and a bicycle frame can be utilized to support at least a portion of a rider's weight. The spring can enable the saddle to move with respect to the bicycle frame to absorb bumps.

SUMMARY

The systems, methods, and devices described herein have innovative aspects, no single one of which is indispensable or solely responsible for their desirable attributes. Without limiting the scope of the claims, some of the advantageous features will now be summarized.

One aspect of one embodiment is that it may be desirable to enable a saddle to move downward with respect to a bicycle frame in response to a terrain induced force (e.g., a force directed upward into the bicycle frame by a wheel contacting a terrain feature), but to not move downward in response to a rider induced force (e.g., a force directed downward into the saddle by the rider adjusting his or her position, the rider pumping the pedals, and/or the like). Such a configuration can be desirable to, among other things, enable a distance from the saddle to the pedal crank to remain constant while the rider is pedaling.

According to some embodiments, a bicycle saddle suspension assembly comprises: a body configured to couple to a bicycle frame; a saddle support mechanism configured to couple to a bicycle saddle, the saddle support mechanism movable in first and second directions with respect to the body; a suspension spring that biases the saddle support mechanism in the first direction with respect to the body; and a damping apparatus configured to damp motion of the saddle support mechanism with respect to the body, the damping apparatus comprising: an inertia mass configured to have open and closed positions, wherein in the open position, the inertia mass permits a flow of damping fluid through an orifice, and, in the closed position, the inertia mass reduces said flow of said damping fluid through the orifice; and a biasing spring that biases the inertia mass to the closed position, wherein the inertia mass and biasing spring are configured to enable the inertia mass to move toward the open position in response to an externally-applied force above a predetermined threshold.

In some embodiments, the suspension assembly further comprises a linkage mechanism that couples the saddle support mechanism to the body. In some embodiments, the suspension assembly further comprises a support tube coupled to the saddle support mechanism, the support tube slidably coupled to the body. In some embodiments, the first direction is away from the body and the second direction is toward the body. In some embodiments, the first direction is opposite the second direction. In some embodiments, the inertia mass is configured to slide in the first and second directions with respect to the body. In some embodiments, the suspension spring comprises an air spring. In some embodiments, the damping apparatus is configured to generate a damping force that is no more than 15 pounds greater with the inertia mass in the closed position than with the inertia mass in the open position when the saddle support mechanism is moving in the second direction at a rate of 0.760 inches per second. In some embodiments, the damping apparatus is configured to generate a damping force that is no more than 25 pounds greater with the inertia mass in the closed position than with the inertia mass in the open position when the saddle support mechanism is moving in the second direction at a rate of 0.760 inches per second. In some embodiments, the damping apparatus is configured to generate a damping force that is no more than 50 pounds greater with the inertia mass in the closed position than with the inertia mass in the open position when the saddle support mechanism is moving in the second direction at a rate of 0.760 inches per second. In some embodiments, the suspension spring comprises a nonlinear spring rate. In some embodiments, a full stroke of the saddle support mechanism comprises a range from a fully extended position in the first direction to a fully retracted position in the second direction with respect to the body, and wherein an average spring rate of the suspension spring is configured to be no greater than 12.5 Newtons per millimeter from 33% to 66% of the full stroke when the saddle support mechanism is moving in the second direction. In some embodiments, a full stroke of the saddle support mechanism comprises a range from a fully extended position in the first direction to a fully retracted position in the second direction with respect to the body, and wherein an average spring rate of the suspension spring is configured to be no greater than 12.5 Newtons per millimeter from 10% to 66% of the full stroke when the saddle support mechanism is moving in the second direction. In some embodiments, a full stroke of the saddle support mechanism comprises a range from a fully extended position in the first direction to a fully retracted position in the second direction with respect to the body, and wherein a reaction force generated by the suspension spring is configured to vary by no more than 110 Newtons from 33% to 66% of the full stroke when the saddle support mechanism is moving in the second direction. In some embodiments, a full stroke of the saddle support mechanism from a fully extended position in the first direction to a fully retracted position in the second direction comprises at least 25 millimeters.

According to some embodiments, a bicycle assembly comprises: a bicycle frame; a wheel rotatably coupled to the frame; a bicycle saddle coupled to the frame and movable in extend and retract directions with respect to the frame; a suspension spring that biases the saddle in the extend direction with respect to the frame; and a damping apparatus configured to damp motion of the saddle with respect to the frame, the damping apparatus comprising: an inertia mass configured to have open and closed positions, wherein in the open position, the inertia mass permits a flow of damping fluid through an orifice, and, in the closed position, the inertia mass reduces said flow of said damping fluid through the orifice; and a biasing spring that biases the inertia mass to the closed position, wherein the inertia mass and biasing spring are configured to enable the inertia mass to move toward the open position in response to a terrain-induced force above a predetermined threshold applied to the wheel, and wherein the inertia mass and biasing spring are configured to retain the inertia mass in the closed position in response to a rider-induced force applied to the saddle.

In some embodiments, the bicycle saddle is coupled to the frame using a linkage mechanism. In some embodiments, the bicycle saddle is coupled to the frame using a tubular support that is configured to slide in the extend and retract directions with respect to the frame. In some embodiments, the inertia mass is configured to translate in the extend and retract directions with respect to the frame. In some embodiments, the inertia mass and saddle are configured to translate collinearly along a longitudinal axis of a saddle post. In some embodiments, the suspension spring comprises an air spring. In some embodiments, the damping apparatus is configured to generate a damping force that is no more than 15 pounds greater with the inertia mass in the closed position than with the inertia mass in the open position when the saddle is moving in the retract direction at a rate of 0.760 inches per second. In some embodiments, the damping apparatus is configured to generate a damping force that is no more than 25 pounds greater with the inertia mass in the closed position than with the inertia mass in the open position when the saddle is moving in the retract direction at a rate of 0.760 inches per second. In some embodiments, the damping apparatus is configured to generate a damping force that is no more than 50 pounds greater with the inertia mass in the closed position than with the inertia mass in the open position when the saddle is moving in the retract direction at a rate of 0.760 inches per second. In some embodiments, the suspension spring comprises a nonlinear spring rate. In some embodiments, a full stroke of the saddle comprises a range from a fully extended position in the extend direction to a fully retracted position in the retract direction with respect to the frame, and wherein an average spring rate of the suspension spring is configured to be no greater than 12.5 Newtons per millimeter from 33% to 66% of the full stroke when the saddle is moving in the retract direction. In some embodiments, a full stroke of the saddle comprises a range from a fully extended position in the extend direction to a fully retracted position in the retract direction with respect to the frame, and wherein an average spring rate of the suspension spring is configured to be no greater than 12.5 Newtons per millimeter from 10% to 66% of the full stroke when the saddle is moving in the retract direction. In some embodiments, a full stroke of the saddle comprises a range from a fully extended position in the extend direction to a fully retracted position in the retract direction with respect to the frame, and wherein a reaction force generated by the suspension spring is configured to vary by no more than 110 Newtons from 33% to 66% of the full stroke when the saddle is moving in the retract direction. In some embodiments, a full stroke of the saddle from a fully extended position in the extend direction to a fully retracted position in the retract direction comprises at least 25 millimeters.

According to some embodiments, a bicycle saddle suspension assembly comprises: a first support configured to attach to or form part of a bicycle frame; a second support slidably coupled to the first support such that the second support can slide in extend and retract directions with respect to the first support, a distal end of the second support being configured to attach to a bicycle saddle; a suspension spring that biases the second support in the extend direction with respect to the first support; and a damping apparatus configured to damp motion of the second support with respect to the first support, the damping apparatus comprising: an inertia mass configured to have open and closed positions, wherein in the open position, the inertia mass permits a flow of damping fluid through an orifice, and, in the closed position, the inertia mass reduces said flow of said damping fluid through the orifice; and a biasing spring that biases the inertia mass to the closed position, wherein the inertia mass and biasing spring are configured to enable the inertia mass to move toward the open position in response to acceleration of the first support in a direction toward the distal end of the second support.

In some embodiments, inertia mass is disposed at least partially within a cavity of the first support. In some embodiments, the inertia mass and second support comprise collinear longitudinal axes. In some embodiments, the suspension spring comprises an air spring disposed at least partially within a cavity of the first support. In some embodiments, the damping apparatus is configured to generate a damping force that is no more than 15 pounds greater with the inertia mass in the closed position than with the inertia mass in the open position when the second support is moving in the retract direction at a rate of 0.760 inches per second. In some embodiments, the damping apparatus is configured to generate a damping force that is no more than 25 pounds greater with the inertia mass in the closed position than with the inertia mass in the open position when the second support is moving in the retract direction at a rate of 0.760 inches per second. In some embodiments, the damping apparatus is configured to generate a damping force that is no more than 50 pounds greater with the inertia mass in the closed position than with the inertia mass in the open position when the second support is moving in the retract direction at a rate of 0.760 inches per second. In some embodiments, the suspension spring comprises a nonlinear spring rate. In some embodiments, a full stroke of the second support comprises a range from a fully extended position in the extend direction to a fully retracted position in the retract direction with respect to the first support, and wherein an average spring rate of the suspension spring is configured to be no greater than 12.5 Newtons per millimeter from 33% to 66% of the full stroke when the second support is moving in the retract direction. In some embodiments, a full stroke of the second support comprises a range from a fully extended position in the extend direction to a fully retracted position in the retract direction with respect to the first support, and wherein an average spring rate of the suspension spring is configured to be no greater than 12.5 Newtons per millimeter from 10% to 66% of the full stroke when the second support is moving in the retract direction. In some embodiments, a full stroke of the second support comprises a range from a fully extended position in the extend direction to a fully retracted position in the retract direction with respect to the first support, and wherein a reaction force generated by the suspension spring is configured to vary by no more than 110 Newtons from 33% to 66% of the full stroke when the second support is moving in the retract direction. In some embodiments, a full stroke of the second support mechanism from a fully extended position in the extend direction to a fully retracted position in the retract direction comprises at least 25 millimeters.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not

DETAILED DESCRIPTION

Figure 1A:
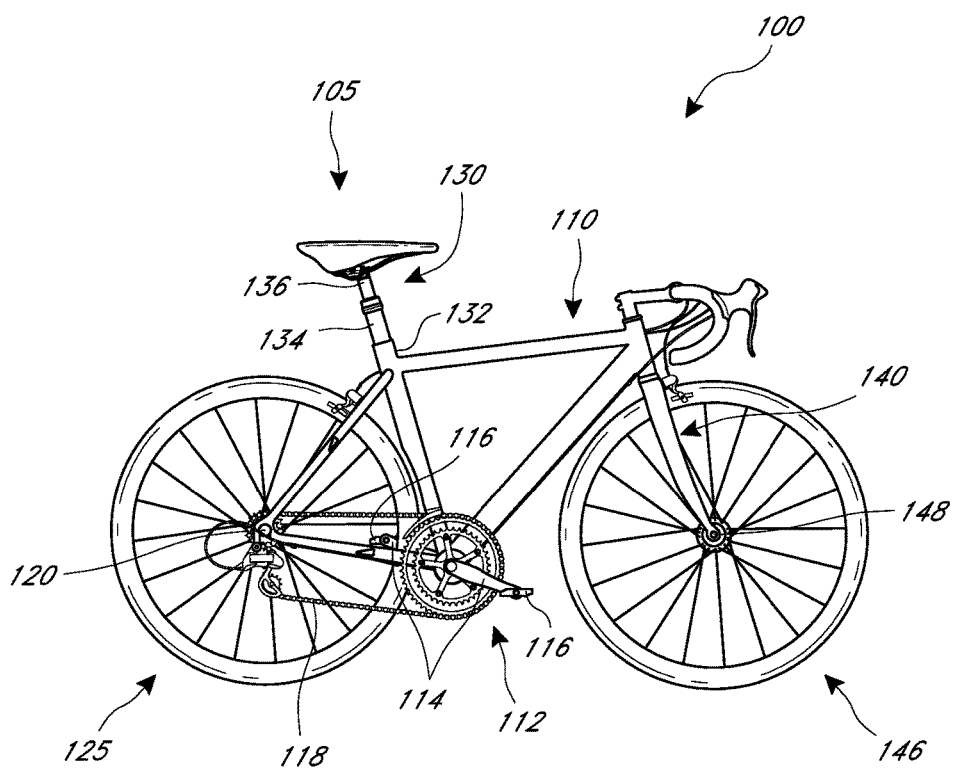
FIG. 1A is a side view of an embodiment of a bicycle having a saddle post suspension assembly.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the FIGS., can be arranged, substituted, combined, and designed in a wide variety of different configurations, all of which are explicitly contemplated and form part of this disclosure. For example, a system or device may be implemented or a method may be practiced using any number of the aspects set forth herein. In addition, such a system or device may be implemented or such a method may be practiced using other structure, functionality, or structure and functionality in addition to or other than one or more of the aspects set forth herein. Alterations and further modifications of the inventive features illustrated herein, and additional applications of the principles of the inventions as illustrated herein, which would occur to one skilled in the relevant art and having possession of this disclosure, are to be considered within the scope of the invention.

Descriptions of unnecessary parts or elements may be omitted for clarity and conciseness, and like reference numerals refer to like elements throughout. In the drawings, the size and thickness of layers and regions may be exaggerated for clarity and convenience.

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description" one will understand how illustrated features serve to explain certain principles of the present disclosure.

Historically, bicycles have been built using rigid frame designs, meaning any terrain-induced bumps are mostly transferred through the frame to the rider. Some bump absorption is accomplished, however, through flexibility of the tires and at least some limited flexibility of the frame. Suspension components (e.g., springs, dampers, and/or the like) have since been added to some bicycles, such as off-road mountain bikes, to increase riding comfort and efficiency. For example, bicycle forks may comprise a spring and damper system that supports a rider, but enables the forks to collapse at least partially when the front wheel of the bicycle hits a bump. Further, rear suspension mechanisms have been created that enable the rear wheel to move with respect to a bicycle frame to absorb bumps introduced at the rear wheel. Road bikes, however, are often still built using rigid frame designs.

Another example of a bicycle suspension mechanism is a saddle suspension, which enables a bicycle saddle to move with respect to a bicycle frame. A saddle suspension may be used alone or in combination with a front and/or rear suspension. An ideal usage of a saddle suspension, however, is in a road bike, which often comprises a rigid frame design, not having any other suspension components. FIG. 1A, as will be further described below, illustrates such a rigid frame bicycle 100 comprising a suspension saddle post 130. A bicycle saddle suspension can be desirable because, among other things, it may enable a rigid frame bicycle, such as a road bike or other bicycle without a front and/or rear suspension to have suspension relatively easily added to it. For example, a saddle suspension may in some embodiments be designed to replace a standard removable bicycle saddle post. In such an embodiment, a bicycle that does not currently incorporate any suspension components may have a saddle suspension assembly as disclosed herein relatively easily added to the bicycle.

Figure 1B:
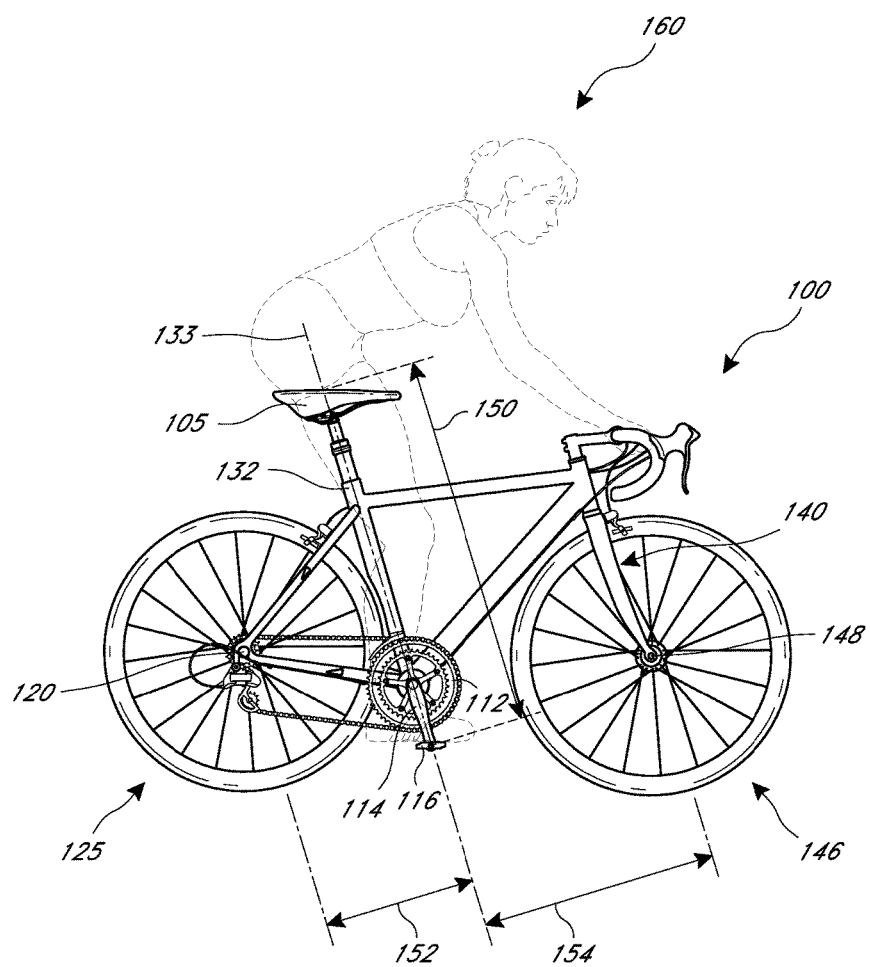
FIG. 1B is a side view of the bicycle of FIG. 1A with a rider positioned thereon.

One detriment to a typical saddle suspension is that a saddle suspension enables a distance between the bicycle saddle and a pedal crank to vary (e.g., distance 150 shown in FIG. 1B, which in this embodiment is the distance between the top surface of the bicycle saddle 105 and the top surface of the pedal 116, measured along a line coincident with the axis 133 of the saddle post 130 of the bicycle 100 when an axis of the pedal arm 114 is aligned with the axis 133 of the saddle post 130). For example, when the rear wheel 125 of the bicycle 100 hits a bump, the rear wheel 125 and pedal crank 112 may move upward with respect to the saddle 105, thus decreasing distance 150. Research has shown that the distance between the saddle and pedal crank is an important setting to enable a rider to have maximum efficiency when pedaling the bicycle. This is especially important for road bikes, because when riding on the road, the rider's position remains relatively constant, and the rider spends the majority of his or her time in the saddle. With mountain bikes, on the other hand, a rider will often spend a significant amount of time out of the saddle while pedaling. One example of research indicating that saddle height (e.g., saddle distance from the pedal crank and/or pedals) is an important factor is given in *Andy Pruitt's Fit Tips*, Road Cycling UK (Jan. 23, 2007), http://roadcyclinguk.com/gear/andy-pruitts-fit-tips.html. Similar information is also presented in Andrew L. Pruitt, *Andy Pruitt's Complete Medical Guide for Cyclists* (2006). Other such references include Mr. Rodrigo Bini et al., *Effects of Bicycle Saddle Height on Knee Injury Risk and Cycling Performance*, Sports Medicine, June 2011, Volume 41, Issue 6, pp 463-476; Tony Wanich, M D et al., *Cycling Injuries of the Lower Extremity*, J Am Acad Orthop Surg, December 2007, vol. 15 no. 12 748-756; and Will W Peveler, *Effects of Saddle Height on Economy in Cycling*, Journal of Strength & Conditioning Research, July 2008, Volume 22, Issue 4, pp 1355-1359. All of the foregoing references are hereby incorporated herein by reference in their entirety.

With a typical saddle suspension, even if a user sets the saddle height at an optimum distance away from the pedal crank in a resting position, the saddle may move up and down with respect to the pedal crank in response to varying loads introduced by the rider while the rider is pumping the pedals. This will thus vary the saddle height (e.g., dimension 150 of FIG. 1B) while the rider is pumping the pedals, instead of keeping the saddle height at the optimum setting. Given this characteristic of a typical saddle suspension, saddle suspensions have primarily only been used by casual riders (e.g., riders not as concerned with their riding efficiency).

Saddle suspensions can be desirable due to, among other things, their smaller size, lighter weight, and/or reduced complexity as compared to, for example, a typical rear wheel suspension. However, if the saddle height will change appreciably in response to a rider pumping the pedals, a saddle suspension will likely not be desirable to anyone but casual riders. While it is desirable for the saddle to move downward with respect to the pedal crank to absorb a terrain induced bump, it is not desirable to have the saddle move in any direction with respect to the pedal crank in response to user induced forces (e.g., from shifting body weight while pumping the pedals). Accordingly, a saddle post suspension that is responsive to terrain induced forces but not to rider induced forces would be desirable to a broad range of riders, from casual to professional.

Inertia Valve Saddle Post Suspension

The disclosure herein presents embodiments of saddle suspension systems that are sensitive to terrain induced forces but not to rider induced forces. For example, some embodiments include a saddle post that comprises spring and damping features, with a level of damping being at least partially controllable by an inertia valve. Desirably, a terrain induced force (e.g., a force created by a wheel contacting a terrain feature) causes the inertia valve to activate or open, decreasing the damping of downward saddle movement with respect to the bicycle frame. Further, desirably, a rider induced force (e.g., a force created by a rider, such as by shifting his or her body weight on the saddle while pumping the pedals) does not cause the inertia valve to activate or open, and thus does not cause a decrease in the damping of downward saddle movement with respect to the bicycle frame.

As will be further discussed below, a desirable feature of an inertia valve saddle post suspension is that the saddle post suspension provides less resistance to downward motion of the saddle with respect to the bicycle frame when the inertia valve is open than when the inertia valve is closed. In some embodiments, no downward motion of the saddle is allowed with the inertia valve closed, and downward motion of the saddle is allowed with the inertia valve open. However, in various other embodiments, some downward motion of the saddle is allowed with the inertia valve closed, but opening or activating the inertia valve decreases the resistance to downward motion of the saddle, such as by decreasing a magnitude of damping. Further, in some embodiments, an inertia valve saddle suspension can comprise one or more mechanisms that desirably make the suspension at least partially responsive to rider induced forces.

For example, some embodiments comprise a force-sensitive inertia valve bypass circuit that enables damping fluid to bypass the inertia valve circuit (and thus enables downward movement of the saddle with respect to the bicycle frame even if the inertia valve is not open) when a compression force above a predetermined threshold level is applied to the saddle and/or bicycle frame. Such a force-sensitive inertia valve bypass circuit may be desirable, for example, to act as a safety mechanism that enables the saddle to drop or displace with respect to the bicycle frame (and/or reduces resistance to the saddle dropping or displacing) when a relatively significant force is applied to the bicycle saddle and/or bicycle frame. For example, if a rider is in a standing position and quickly drops onto the saddle, in some embodiments it may be desirable to have the saddle drop with respect to the bicycle frame, at least somewhat, to lessen a magnitude of an impact force between the saddle and the rider, thus reducing a chance of injury. As another example, if a rider hits a relatively large bump in the road, the inertia valve will desirably open, because this is a terrain induced force. However, the relatively large magnitude of the force may be such that the inertia valve circuit alone is not able to reduce an amount of damping to a sufficiently desirable level. Accordingly, in such a case, a force-sensitive inertia valve bypass circuit may be used to decrease the overall damping to a lower magnitude than what the inertia valve circuit alone is capable of. In some embodiments, desirably no damping fluid is able to pass through the force-sensitive inertia valve bypass circuit when a force below the threshold level is applied, but damping fluid is able to pass through the force-sensitive inertia valve bypass circuit when a force above the threshold level is applied. In other embodiments, some damping fluid may be able to flow through the force-sensitive inertia valve bypass circuit when the applied force is below the threshold level, but the mechanism is configured to reduce its resistance to damping fluid flow when the applied force is above the threshold level. For example, the mechanism may in some embodiments comprise a shim stack that, in a relaxed state, covers or substantially covers one or more fluid flow path orifices. When a force above a predetermined threshold level is applied to the shim stack by damping fluid, the shim stack may displace, bend, or otherwise move away from the one or more orifices to enable damping fluid to flow (or to more easily flow, or to flow with less resistance) through the orifices. One example of such a force-sensitive inertia valve bypass circuit is described below with reference to the inertia valve bypass circuit 328 illustrated in FIGS. 4A-4D.

The example given above is of a force-sensitive inertia valve bypass circuit, meaning the level of damping provided by the bypass circuit is at least partially dependent on the force applied to the bypass circuit by damping fluid (e.g., higher or infinite damping at a lower applied force, and lower or no damping at a higher applied force). This changing level of damping can be accomplished by, for example, mechanical elements that vary an effective cross-sectional area of one or more fluid flow paths, enable one or more fluid flow paths to open at or above a threshold load, or that otherwise reduce a level of damping at or above a threshold load. It can also (or alternatively) be desirable, in some embodiments, to include a non-force sensitive inertia valve bypass circuit. An inertia valve bypass circuit that is not force sensitive can be configured to desirably provide the same or substantially the same magnitude or level of damping regardless of the magnitude of force applied to the bypass circuit by damping fluid. For example, a non-force sensitive inertia valve bypass circuit may be configured to have one or more orifices and/or fluid paths through which damping fluid can flow regardless of whether the inertia valve is open or closed. The effective cross-sectional area of the orifices and/or fluid paths (and/or other mechanical features that contribute to a level of damping) may be configured to remain the same regardless of the amount of force applied to the circuit by the damping fluid. In some embodiments, however, the level of damping provided by a non-force sensitive inertia valve bypass circuit may be adjustable, such as by a rider or user of the system. For example, the inertia valve bypass circuit mechanism may be configured to enable a user to adjust the effective cross-sectional area of the fluid flow paths and/or orifices (and/or to adjust other mechanical features that contribute to a level of damping), thus adjusting the magnitude of damping. One example of such a non-force sensitive inertia valve bypass circuit is described below with reference to the inertia valve bypass circuit 330 illustrated in FIG. 4A.

It should be noted that, for convenience when describing various embodiments herein, the terms upper, lower, up, down, upward, downward, and the like are used to describe relative motion of, for example, a bicycle saddle or a saddle post component with respect to a bicycle frame or other component. These terms are generally used to describe motion of the components with respect to the vertical orientation shown in FIGS. 3A and 3B. One of skill in the art will recognize that, in use, the saddle post may not be oriented in a completely vertical orientation. For example, with reference to FIG. 1A, the saddle post 130 as used with bicycle 100 is tilted backward somewhat with respect to a vertical reference. When appropriate, the terms outward, extend direction, and/or the like may be used interchangeably with up, upper, upward, and/or the like. Further, when appropriate, the terms inward, retract direction, and/or the like may be used interchangeably with the terms down, lower, downward, and/or the like.

Although various embodiments disclosed herein include a saddle post that comprises spring and damping features positioned within a sliding cylindrical arrangement, the concepts disclosed herein are also applicable to other styles of saddle suspensions. For example, the concepts disclosed herein may be used with a linkage-style saddle post suspension that enables motion of the saddle with respect to a bicycle frame using pivoting linkages instead of a sliding cylindrical arrangement.

FIGS. 1A and 1B illustrate a bicycle 100 comprising a saddle post 130 having an inertia valve suspension mechanism that is responsive to terrain induced forces, but selectively nonresponsive or less responsive to rider induced forces. FIG. 1A illustrates a side view of the bicycle 100. FIG. 1B illustrates a side view of the bicycle 100 with a rider 160 mounted thereon. The bicycle 100 comprises a saddle 105 coupled to a saddle post 130 that is coupled to a seat tube 132 of a frame 110. The saddle 105 is configured to move or slide up or down relative to the bicycle frame 110 by an upper support 136 of the saddle post 130 that is configured to slide relative to a lower support 134 of the saddle post 130. In this embodiment, the upper support 136 collapses within the lower support 134; however, other arrangements may be utilized.

The bicycle 100 further comprises a rear wheel 125 rotatably coupled to the bicycle frame 110 at rear axle 120. The bicycle 100 further comprises a pedal crank 112 rotatably coupled to the frame 110, the pedal crank 112 configured to be rotated or driven by two arms 114 extending therefrom and having pedals 116 coupled to distal ends thereof. The pedal crank 112 is coupled to a chain 118 which transfers rotary motion of the pedal crank 112 to the rear wheel 125. This configuration enables rotation of the pedal crank 112 in response to a user pumping the pedals 116 to cause the rear wheel 125 to rotate about rear axle 120.

With reference to FIG. 1B, one of the pedals 116 is depicted at the bottom of a rider's pedaling stroke. Dimension 150 is the distance along axis 133 of seat tube 132 from a top of the saddle 105 to the pedal 116 (sometimes referred to herein as saddle height or as analogous to saddle height). As mentioned above, the distance 150 from the saddle 105 to the pedal 116 at the bottom of the rider's pedal stroke can be an important setting to maximize the rider's pedaling efficiency. If the distance 150 is too great, the rider 160 may hyperextend his or her knees. If the distance 150 is too short, the rider 160 will not be able to put as much power into the pedal crank 112 as if the dimension 150 were set to an optimum setting. Further, if the distance 150 is dynamically changing while the rider is pumping the pedals, it can interrupt and/or negatively affect the rider's cadence.

As discussed above, a saddle suspension as disclosed herein may desirably be utilized with a rigid frame bicycle (for example, a typical road bike), though such a saddle suspension could also be used with a bicycle having one or more other suspension mechanisms. The embodiment of a bicycle 100 illustrated in FIGS. 1A and 1B comprises a rigid frame style road bike.

Inertia Valve Sensitivity Consideration

With reference to FIG. 1B, at the front forks 140, a terrain induced force applied to the front wheel 146 will be aligned with or relatively close to an axis of the forks 140. Further, with respect to the rear wheel 125, a terrain induced force applied to the rear wheel 125 will be passed through the rear axle 120 and aligned in a similar direction as to the terrain induced force at the front wheel 146. As used herein, the term terrain induced force refers to a force applied to a bicycle (e.g., to a wheel of the bicycle) by terrain on which the bicycle is being ridden, wherein the force tends to cause acceleration of the bicycle in a direction away from the terrain. This acceleration may not necessarily cause the bicycle to move in the direction away from the terrain, but may at least reduce a velocity of the bicycle's (or wheel's) motion that is oriented toward the terrain. The term rider induced force, as used herein, refers to a force applied to a bicycle (e.g., to a saddle, pedals, or handlebars, of the bicycle) by a rider riding the bicycle, wherein the force tends to accelerate the bicycle in a direction toward the terrain.

One challenge in designing an inertia valve suspension seat post is that, with reference to FIG. 1B, the axis 133 of the seat post is positioned or spaced away from the rotational axles of the wheels 120, 148. Accordingly, a terrain induced force, which will be introduced by either the front wheel 146 or the rear wheel 125, is introduced at a location spaced away or apart from the axis 133 of the seat tube 132. The inertia valve mechanisms disclosed herein operate at least partially on the principle of F=ma (force=mass×acceleration). When a bicycle wheel is accelerated upward due to, for example, a bump (e.g., a terrain induced force), an inertia mass moves upward at a slower rate than other components, thus opening or activating the inertia valve circuit (see, for example, FIG. 4B, discussed below). Similarly, if a bicycle wheel is moving in a generally downward direction, and the bicycle wheel hits a terrain feature, such as a bump, that slows or stops the wheel's downward motion, the inertia mass can continue moving downward independent of the wheel, thus opening or activating the inertia valve circuit.

Because in this embodiment the seat post axis 133 is spaced away from the wheel axles 120, 148, by distances 152, 154, respectively, the acceleration realized at the saddle post 130 by the wheel impact with the terrain feature will be of a lower magnitude than the acceleration realized at the axle of the wheel. Accordingly, if an inertia valve mechanism internal to the saddle post 130 is to be activated in response to a same or similar terrain bump as a front or rear wheel suspension, the inertia valve mechanism of the saddle post 130 should desirably be more sensitive.

One option to make an inertia valve suspension seat post more sensitive to terrain induced forces is to incorporate a remote reservoir near or in line with the front or rear wheel axles 148, 120. However, it can be desirable to include the inertia valve components within or internal to the seat post 130 to, among other things, reduce complexity, reduce manufacturing costs, increase visual appeal, and/or to enable relatively easy addition of an inertia valve suspension seat post to a rigid frame bicycle. Accordingly, various embodiments disclosed herein are configured to be sensitive to terrain induced forces that are introduced to the bicycle 100 at a point spaced apart from the axis 133 of the seat tube 132. For example, a terrain induced force may be introduced through the rear wheel 125 and rear wheel axle 120, which is positioned distance 152 away from the axis 133 of the seat tube 132. Further, in some embodiments, a terrain induced force may be introduced through the front wheel 146 and front axle 148, which is spaced apart from the seat tube axis 133 by dimension 154.

Through analysis and testing, it was determined that one important difference between the requirements of a suspension seat post and suspension for a rear or front wheel is that, in some embodiments, not as much compression damping is required for a seat post suspension. For example, when a rider is pedaling hard, a significant amount of rider induced downward force or downward weight transfer can be dynamically introduced through the pedals 116 and transferred to the front and rear wheels 146, 125. Accordingly, with a typical front or rear wheel suspension, the system is desirably configured to have relatively high damping to resist these substantial dynamic rider induced forces. However, the rider induced forces introduced through a saddle 105 are generally of a lower magnitude and less dynamic than those introduced through the pedals 116. For example, typical rider induced forces on the saddle 105 may comprise some weight transfer while pedaling or the rider shifting in the saddle to a different riding position, such as for different types of pedaling. For an average rider weighing 180 pounds, the entire weight of the rider needs to be supported by the front and rear wheels, and thus the front and rear suspensions. While seated in the saddle, however, the saddle will typically only need to support about 45 pounds (200 Newtons) of the rider's weight, with the remainder of the rider's weight being supported by the pedals and/or handlebars.

Accordingly, it was discovered that one way to make the inertia valve system of a saddle post suspension more sensitive to terrain induced forces is by reducing the compression damping of the saddle post suspension (as compared to a front or rear wheel suspension). With reduced compression damping, a smaller amount of damping fluid needs to be displaced than with a fork or rear suspension assembly that has higher compression damping. Accordingly, the magnitude of a relatively small terrain induced force realized at the axis 133 of the seat tube 132, such as by the front or rear wheel hitting a bump, may not be sufficient to operate or open an inertia valve circuit of a front or rear wheel suspension, but may be sufficient to operate or open the inertia valve circuit of a seat post suspension with comparatively lower damping as disclosed herein.

FIGS. 5A, 5B, 6, and 7, discussed below, illustrate example spring and damping curves of an inertia valve saddle post suspension, including comparing the damping to a fork suspension.

Example Embodiment of an Inertia Valve Saddle Post Suspension

Figure 2:
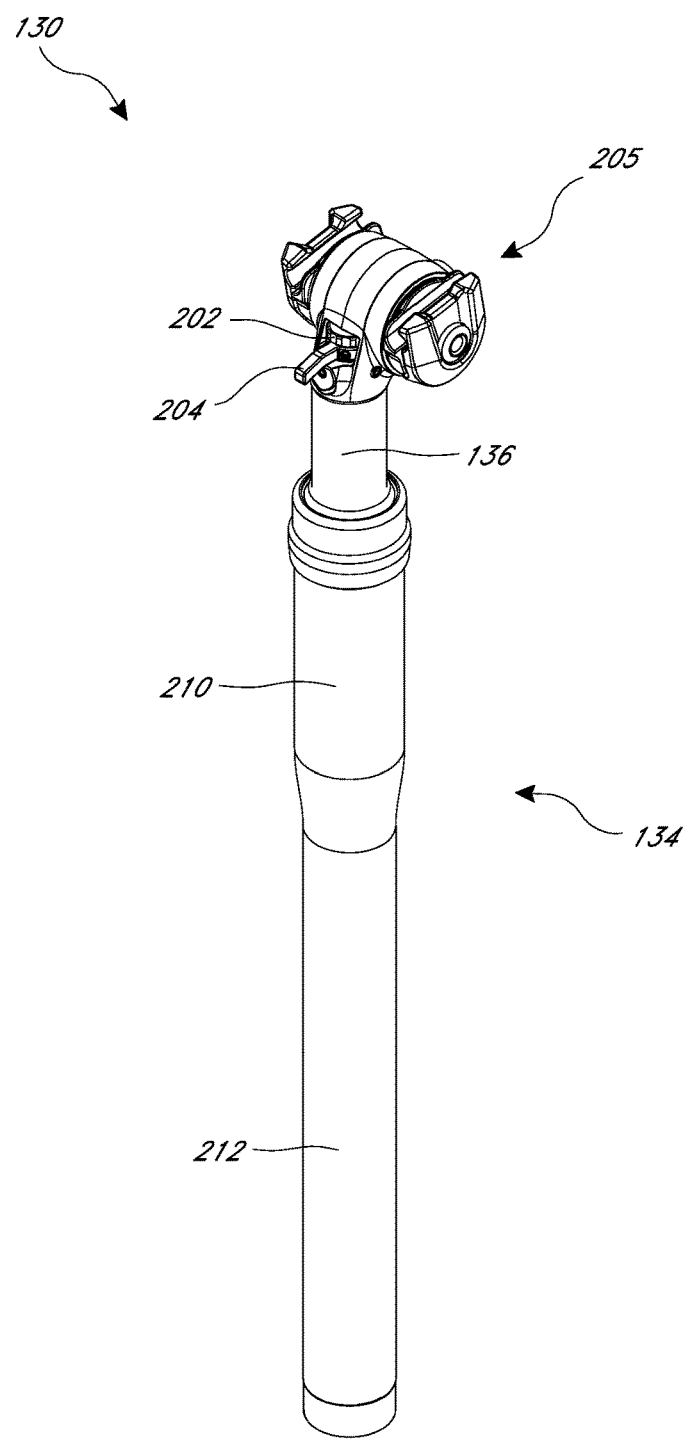
FIG. 2 is a perspective view of an embodiment of a saddle post suspension assembly.

FIG. 2 is a perspective view of the saddle post 130 of FIGS. 1A and 1B. Saddle post 130 comprises an upper support 136 slidably coupled with a lower support 134. In this embodiment, the upper support 136 and lower support 134 are generally cylindrically shaped bodies. However, in various other embodiments, other shapes and configurations may be used. The lower support 134 comprises an upper portion 210 and a lower portion 212. In this embodiment, the upper portion 210 is of a generally cylindrical outer shape that is sized and configured to mate with an interior surface of a seat tube, such as the seat tube 132 of bicycle 100 of FIG. 1A. The saddle post 130 may be configured to be height adjustable, such as by enabling the lower support 134 to be positioned upward or downward with respect to the seat tube 132, and clamping the seat tube 132 onto the upper portion 210 of the lower support 134. In this embodiment, the lower portion 212 comprises a smaller outer diameter than the upper portion 210. This may be desirable in some embodiments to, among other things, enable the lower portion 212 to not interfere with an inner portion of the seat tube (e.g., seat tube 132 shown in FIG. 1A).

The saddle post 130 further comprises a saddle support mechanism 205 disposed at a top or distal end of the upper support 136. The saddle support mechanism 205 is configured to couple to a bicycle saddle, to enable the saddle post 130 to support the saddle.

The view of FIG. 2 also illustrates two user controls of the saddle post 130. One user control is a rebound adjuster 202, and the other is an inertia valve bypass circuit or mechanism adjuster 204. The rebound adjuster 202 comprises a rotatable member that is configured to adjust the amount of rebound damping, such as when the seat post has been compressed and is returning to the expanded state. Further details of the rebound damping system are provided below. The inertia valve bypass mechanism adjuster 204 comprises a rotatable member that is configured to adjust a level of damping provided by an inertia valve bypass mechanism (e.g., bypass circuit, rider induced force sensitivity mechanism, and/or the like), in this embodiment a non-force sensitive bypass mechanism, as discussed below with reference to bypass circuit 330 shown in FIG. 4De.

When the non-force sensitive bypass circuit or mechanism is set to a minimum level, desirably no damping fluid can pass through the bypass mechanism. If the bypass mechanism is set to another setting, at least some damping fluid may be able to pass through the bypass mechanism, enabling the saddle post 130 to at least partially act like a normal spring and damper shock absorber that is responsive to rider induced forces. In some embodiments, setting the bypass mechanism to its lowest setting enables the suspension saddle post 130 to direct all flow through the inertia valve (and/or in some embodiments through a force-sensitive bypass mechanism, such as the bypass circuit 328 shown in FIG. 4A and described below), wherein the system resists or prevents downward motion of the upper support 136 with respect to the lower support 134 until a terrain induced force opens the inertia valve (and/or until a terrain or rider induced force above a threshold level sufficient to activate the force-sensitive bypass mechanism is applied). As the bypass mechanism setting is increased from its minimum setting, the saddle post 130 enables easier downward motion (e.g., reduced compression damping) of the upper support 136 with respect to the lower support 134. Desirably, at its lowest setting, the bypass mechanism provides infinite damping, because no damping fluid can pass through the bypass mechanism. In some embodiments, however, some damping fluid can pass through the bypass mechanism even at its lowest setting. As the bypass mechanism adjuster 204 is adjusted from that minimum setting to a higher setting, the damping provided by the bypass mechanism decreases (e.g., the bypass mechanism's resistance to damping fluid flow therethrough is reduced, such as by increase an effective cross-sectional area of one or more fluid flow paths). In some embodiments, the bypass mechanism is configured to be adjusted in predefined intervals (e.g., using detents or the like). In other embodiments, the bypass mechanism is configured to be continuously or infinitely adjustable. Further details of one embodiment of such a non-force sensitive bypass mechanism or circuit are described below with reference to bypass circuit 330 shown in FIG. 4D.

Figure 3A:
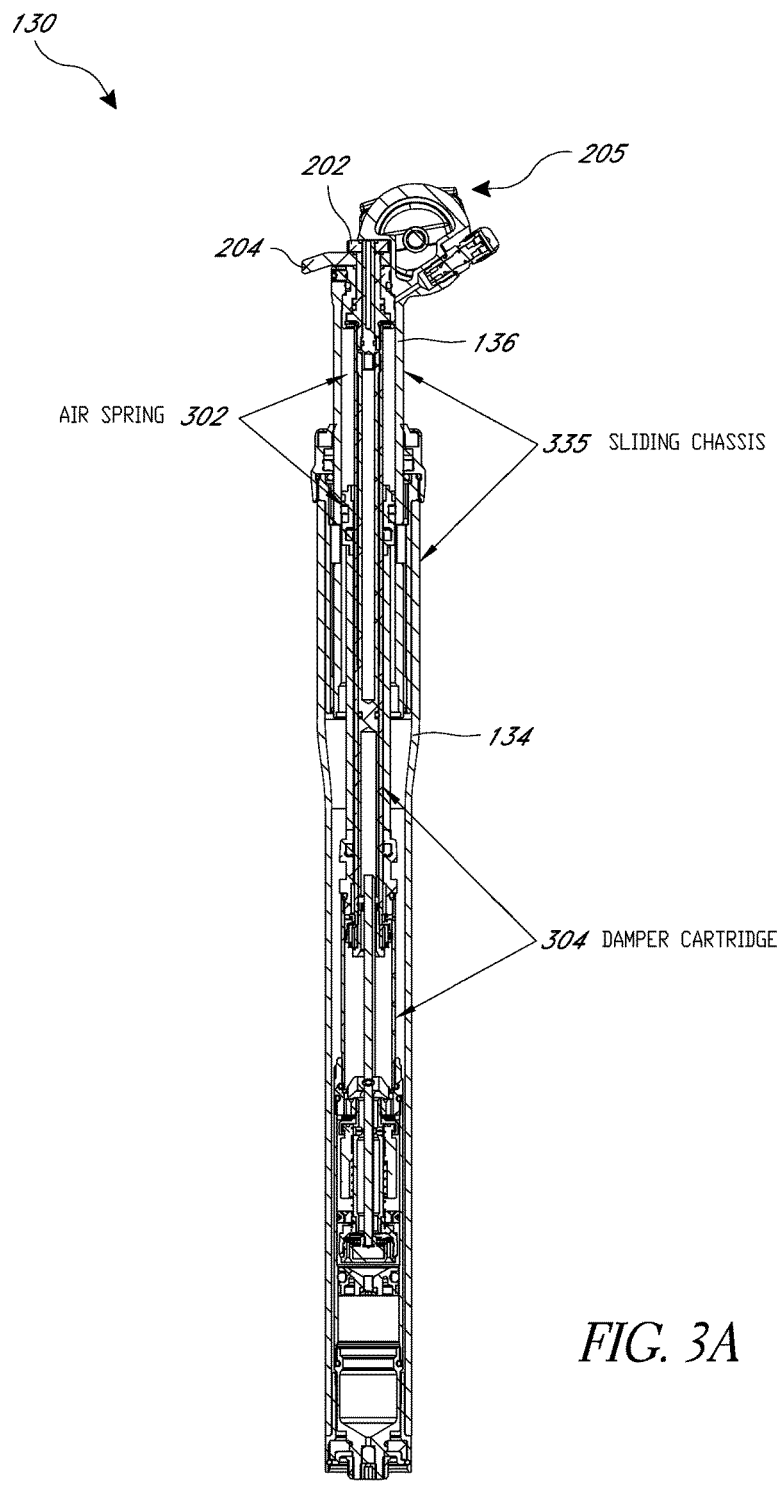
FIGS. 3A and 3B are cross-sectional views of the saddle post suspension assembly of FIG. 2.
Figure 3B:
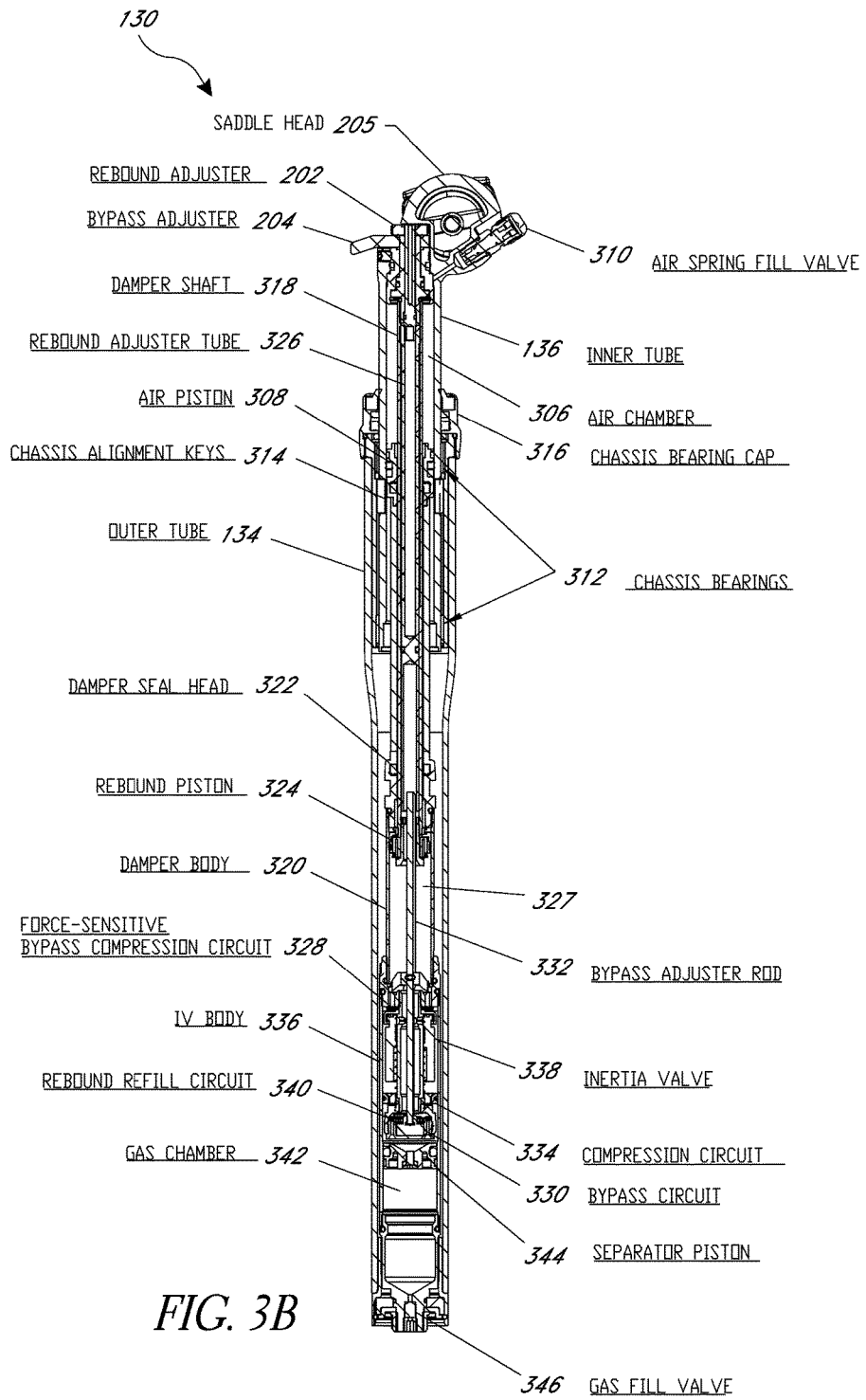

FIGS. 3A and 3B depict cross-sectional views of the saddle post 130 of FIG. 2. FIG. 3A illustrates some of the higher-level components of the saddle post 130, and FIG. 3B illustrates lower-level components and further details of the saddle post 130. As with a typical shock absorber, the saddle post 130 comprises a spring portion and a damper portion. For example, as can be seen in FIG. 3A, the saddle post 130 comprises an air spring 302 and a damper cartridge 304. Unlike a typical shock absorber, however, the damper portion further comprises an inertia valve mechanism 338, as can be seen in FIG. 3B.

With reference to FIG. 3B, the air spring comprises an air chamber 306 that is configured to contain a volume of air, gas, and/or the like. When the inner tube or upper support 136 is translated downward with respect to the outer tube or lower support 134, air piston 308 remains stationary with respect to lower support 134, and thus causes the volume of the air chamber 306 to decrease. Accordingly, the air spring resists downward motion of the upper support 136 with respect to the lower support 134.

The saddle post 130 comprises an air spring fill valve 310 that enables the pressure in the air chamber 306 to be adjusted. For example, the air spring fill valve 310 may comprise a Schrader style valve and/or the like through which air can flow into the air chamber 306. Desirably, the air chamber 306 is configured to bias the upper support 136 in the upward direction with respect to the lower support 134.

The sliding chassis 335 of FIG. 3A refers to the upper and lower supports 136, 134, which slide with respect to each other to enable the saddle to lower with respect to the bicycle frame in response to a terrain induced force or bump (or in some cases in response to a rider induced force). The present embodiment, with reference to FIG. 3B, desirably comprises chassis bearings 312 and chassis alignment keys 314 which help to constrain the sliding motion of the inner tube 136 with respect to the outer tube 134. The chassis bearings 312 provide a sliding surface that enables the inner tube or upper support 136 to slide with reduced friction with respect to the outer tube or lower support 134. The chassis alignment keys 314 provide rotational alignment of the upper support 136 with respect to the lower support 134. For example, the saddle head or saddle support mechanism 205 can be positioned such that the saddle of the bicycle points in a forward direction (to the right with reference to the orientation of FIGS. 1A and 1B). The chassis alignment keys 314 can be configured to ensure the saddle always points in that direction with respect to the bicycle frame. Disposed at a top or distal end of the lower support or outer tube 134 is a chassis bearing cap 316.

The damper cartridge 304 comprises various components that desirably provide both compression and rebound damping. A damper shaft 318 extends from the distal or top end of the upper support 136 to a piston or rebound piston 324 positioned within a damper body 320, which is positioned within the lower support 134. The damper cartridge 304 comprises a fluid chamber 327 having damping fluid positioned therein. A damper seal head 322 provides a seal at a top or distal end of the fluid chamber 327.

The rebound piston 324 comprises one or more passages or orifices that enable damping fluid to pass therethrough. In some embodiments, the level of damping provided by the rebound piston 324 is desirably configured to be adjustable. For example, the rebound adjuster 202 in this embodiment is coupled to a rebound adjuster tube 326 which passes through the damper shaft 318 and connects to the rebound piston 324, or alternatively to a component adjacent the rebound piston 324. Rotation of the rebound adjuster 202, and thus the rebound adjuster tube 326, enables adjustment of the amount of damping provided by the orifices or passages of the rebound piston 324 while the upper support 136 is extending with respect to the lower support 134. Further details of specific fluid flow paths, such as through the rebound piston 324, are given below with reference to FIGS. 4A-4D.

As mentioned above, the bypass mechanism adjuster or lever 204 enables selective adjustment of a bypass mechanism (e.g., to adjust how easily, if at all, damping fluid can bypass the inertia valve by flowing through the bypass mechanism or circuit). As can be seen in FIG. 3B, the bypass mechanism adjuster 204 is coupled to a bypass mechanism adjuster rod 332. The bypass mechanism adjuster rod 332 passes through the inner and outer tubes 136, 134, and connects to a bypass circuit or mechanism 330 positioned near a lower or proximal end of the outer tube 134. Similar to the rebound adjuster 202, rotating the bypass mechanism adjuster 204 causes a component of the bypass mechanism 330 to rotate and thus vary the amount of damping fluid that can pass through the bypass mechanism 330. As mentioned above, in some embodiments, the bypass mechanism adjuster 204 can be positioned such that no damping fluid can pass through the bypass mechanism or circuit 330 (effectively disabling or turning off the bypass mechanism). Additional details on the fluid flow paths through the bypass mechanism or circuit 330 are given below with reference to FIG. 4D.

The saddle post 130 further comprises an inertia valve 338 configured to enable damping fluid to pass therethrough in response to a terrain induced force but not in response to a rider induced force. The inertia valve 338 comprises an outer inertia valve body 336. Inertia valve 338 further comprises a compression circuit 334 that enables fluid to pass therethrough when the inertia valve 338 is open or active. In some embodiments, it can be desirable to include a force-sensitive bypass compression circuit or mechanism 328 (not to be confused with the non-force sensitive bypass mechanism 330, which also is configured to bypass the inertia valve 338). The force-sensitive bypass compression circuit 328 can be used, for example, to enable the suspension post to compress when a force above a predefined threshold level is introduced, regardless of whether the applied force is rider induced or terrain induced. For example, the saddle post 130 may be configured to be relatively stiff and allow relatively little (or no) compression or downward motion of the inner tube 136 with respect to the outer tube 134 when the inertia valve 338 is closed and the non-force sensitive bypass circuit 330 is set at its minimum or completely closed position. However, if a large force is introduced, such as a relatively large downward rider induced force, it may be desirable to allow some movement of the inner tube 136 with respect to the outer tube 134, such as to reduce a risk of injuring the rider and/or damaging components. In this situation, the force-sensitive bypass compression circuit 328 may be configured to open to allow compression of the saddle post 130, even though damping fluid may not be allowed to pass through the inertia valve 338, or the non-force sensitive bypass mechanism 330.

With further reference to FIG. 3B, the suspension post 130 further comprises a rebound refill circuit 340 positioned adjacent a lower or proximal end of the outer tube 134. The rebound refill circuit 340 is configured to enable at least partially controlled return of damping fluid into the fluid chamber 327 when the upper support 136 is extending with respect to the lower support 134. Further details of the flow paths in the rebound refill circuit 340 are given below with reference to FIG. 4C. One advantage of having a rebound circuit separate from compression circuits is that the rebound damping can be separately adjusted. For example, some riders may desire relatively little, or even no damping on rebound or return (e.g., the saddle extending back upward after being displaced downward). Other riders, however, may prefer more damping, for example, to avoid injury due to the saddle snapping upward.

The saddle post 130 further comprises a gas chamber 342 having a separator piston 344 disposed at a top or distal end thereof. A gas fill valve 346 is in fluid communication with the gas chamber 342 to enable adjustment of a pressure of a fluid, air, or gas within the gas chamber 342. The separator piston 344 is configured to move down with respect to the lower support 134 in response to damping fluid being forced downward from the fluid chamber 327 through, for example, the bypass compression circuit 328, the inertia valve 338, the compression circuit 334, and/or the bypass mechanism or circuit 330. As the separator piston 344 moves downward, the gas or air within the gas chamber 342 is compressed, thus increasing a pressure within the gas chamber 342. When the upper support 136 is rebounding or extending with respect to the lower support or outer tube 134, the separator piston 344 moves back upward as the damping fluid moves back through the rebound refill circuit 340 and back into the fluid chamber 327.

Fluid Flow Paths

FIGS. 4A-4D show cross-sectional views of the damping portion of the saddle post 130 of FIGS. 3A and 3B. These views illustrate example damping fluid flow paths under various conditions. One of skill in the art will recognize that the flow paths illustrated in these figures provide one example, and various other flow paths may be utilized to accomplish similar functions. As oriented in FIGS. 4A-4D (with the text upright and arranged left to right), the saddle post 130 is shown on its side, with the bottom of the saddle post 130 being oriented toward the right side of the page. Accordingly, any references to the upward or extend direction are oriented to the left, and any references to the downward or retract direction are oriented to the right.

Figure 4A:
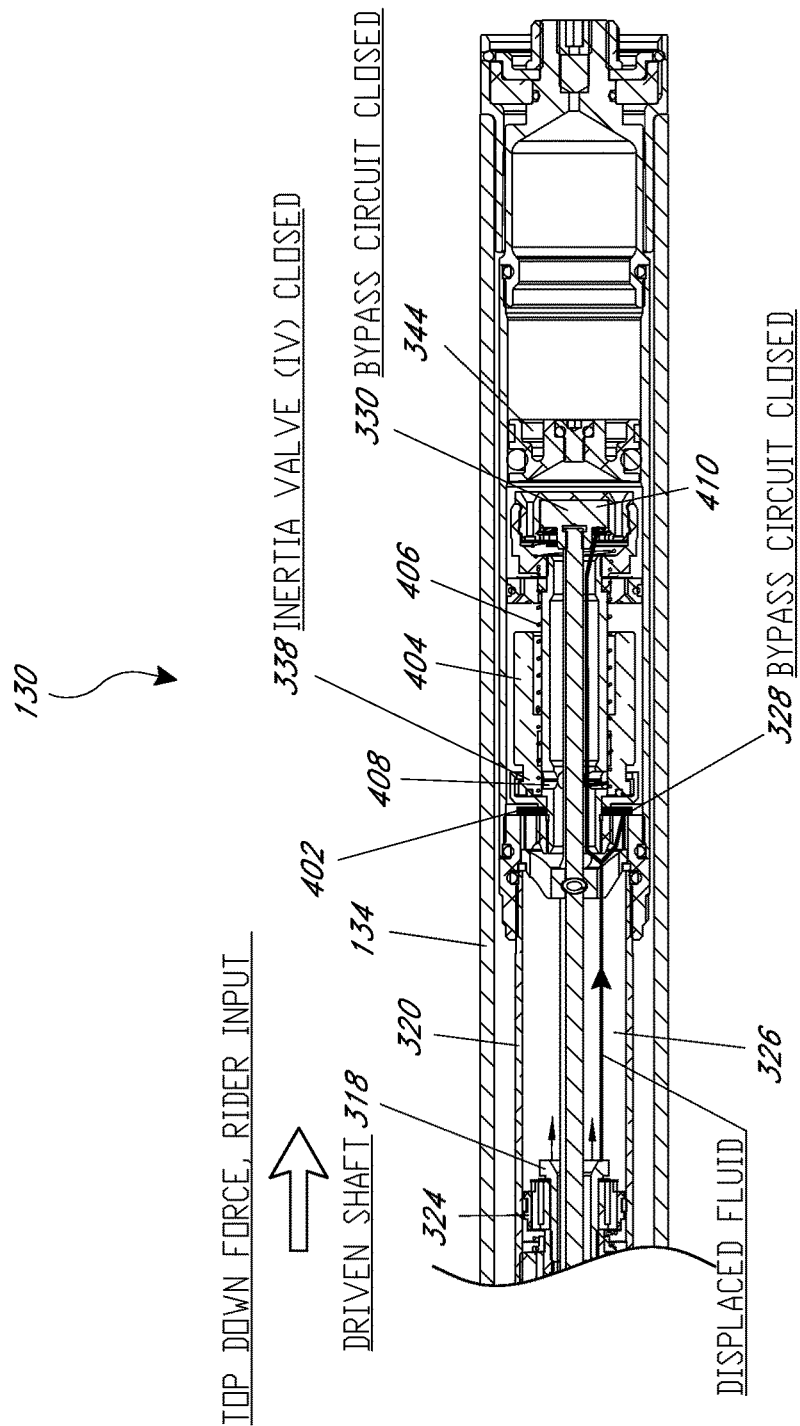
FIGS. 4A-4D illustrate various configurations of the saddle post suspension assembly of FIG. 2 when subjected to a variety of external forces.

FIG. 4A illustrates the configuration of the damping features of the saddle post 130 when a top-down force, such as a rider induced force (e.g., caused by a rider repositioning himself or herself on the saddle, body weight transfer due to the rider pumping the pedals, and/or the like) is introduced through the saddle. Accordingly, the external input force is shown coming from the top or the left side of the drawing as oriented in FIG. 4A.

Further detail of the inertia valve 338 is illustrated in FIG. 4A. The inertia valve 338 comprises an inertia mass 404 that is configured to be able to slide in the extend and retract directions with respect to the lower support 134. As can be seen in FIG. 4A, a spring 406 is configured to bias the inertia mass 404 in the upper or extended direction (or leftward with respect to the orientation of FIG. 4A). In this home or normally closed position or configuration, the inertia mass 404 is blocking one or more orifices 408. The orifices 408 are one potential pathway for damping fluid that is positioned within the fluid chamber 326 to be pushed out of the fluid chamber 326. In this situation shown in FIG. 4A, where a top-down force has been introduced by the rider (and thus the saddle post is accelerated downward), the inertia mass 404 remains in position over the orifices 408, and no damping fluid is able to pass through the orifices 408. Note, however, that in some embodiments, the inertia mass 404 may be configured to still enable some amount of damping fluid to pass through an orifice while the inertia mass is in its home or closed position, and the inertia mass may be configured to enable more damping fluid to flow through one or more orifices when the inertia mass moves as a result of a terrain induced force.

Two other potential compression damping fluid flow paths are illustrated in FIG. 4A. First, fluid is shown stopping at a one-way valve portion or shim stack 402. The one-way valve portion or shim stack 402 is part of the force-sensitive bypass compression circuit 328. As discussed above, the bypass circuit 328 is configured to enable fluid to bypass the inertia valve if a large enough downward force is applied. In the situation shown in FIG. 4A, the top-down rider input force is not sufficient to overcome or to open the one-way valve portion or shim stack 402, and fluid is not able to pass from the fluid chamber 326 through the one-way valve portion or shim stack 402. Note that, although a shim stack is used in this embodiment as a one-way valve (e.g., a blowoff valve, pressure sensitive valve, and/or the like), various other methods may be used to achieve the same or similar purpose.

The third potential pathway of fluid out of the fluid chamber 326 is through the non-force sensitive bypass mechanism or circuit 330. In this embodiment, the bypass mechanism 330 is closed, because rotating member 410 is in a position that does not enable displaced fluid to flow through the rotating member 410. As will be described below, FIG. 4D illustrates a configuration wherein the rotating member 410 is positioned to enable fluid to pass therethrough.

As can be seen in FIG. 4A, in this situation, where a force is introduced top-down by the rider, damping is relatively high (or in some cases infinite) because relatively little fluid or no fluid is able to be moved out of fluid chamber 326. All of the three potential fluid flow paths, namely the force-sensitive inertia valve bypass mechanism or circuit 328, inertia valve 338, and non-force sensitive bypass mechanism or circuit 330 are closed. Accordingly, in this situation, the saddle of the bicycle will remain stationary or substantially stationary and will not move downward (or will move downward relatively little) with respect to the lower support 134. It should be noted that, although FIG. 4A only illustrates a top-down force, there will also typically be a bottom-up reaction force provided by the bicycle frame.

However, because the top-down force is the primary force, and the bottom-up force is merely a reaction to the top-down force, any acceleration of the saddle post 130 will be downward, thus keeping the inertia valve 328 closed. In some cases, there may be some upward acceleration of the saddle post 130, but it may be insufficient to open the inertia valve 328.

Figure 4B:
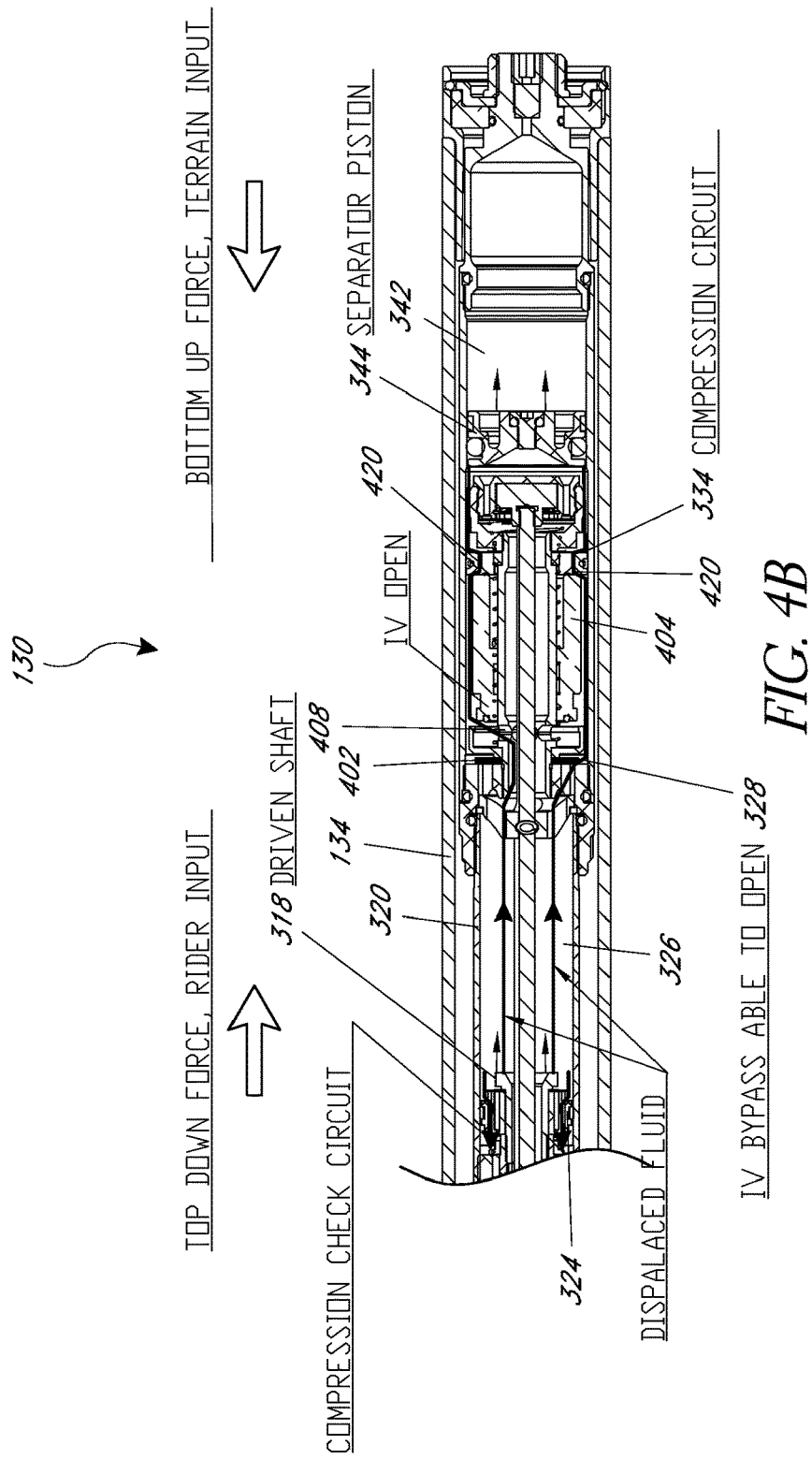

FIG. 4B illustrates a situation where a bottom-up, terrain induced force, is being applied to the saddle support 130. The bottom-up force is generated by, for example, a wheel of the bicycle hitting a bump on a trail or road. A top-down force is also applied by the rider on the saddle (as simply a reaction force and/or due to rider weight redistribution, and/or the like). In this case, the acceleration of the saddle post 130 provided by the bottom-up force is sufficient to open the inertia valve 328. Accordingly, with further reference to FIG. 4B, the inertia mass 404 has moved to the right or downward in response to the acceleration. The movement of the inertia mass 404 has opened a pathway through orifices 408 for fluid to pass therethrough from fluid chamber 326. The fluid passes through the orifices 408 and causes separator piston 344 to move downward (or to the right as oriented in FIG. 4B), enabling the saddle to lower with respect to the bicycle frame.

FIG. 4B also shows fluid flow out of the fluid chamber 326 through a second flow path, namely the one-way valve portion or shim stack 402 of the force-sensitive inertia valve bypass circuit 328. Fluid that flows from the fluid chamber 326 through the inertia valve bypass circuit 328 also causes the separator piston 344 to move downward. With further reference to FIG. 4B, it can be seen that the fluid passing through both the inertia valve bypass circuit 328 and the inertia valve orifices 408 passes through compression circuit 334. Compression circuit 334 comprises orifices 420 which provide further damping by restricting fluid flow therethrough.

Figure 4C:
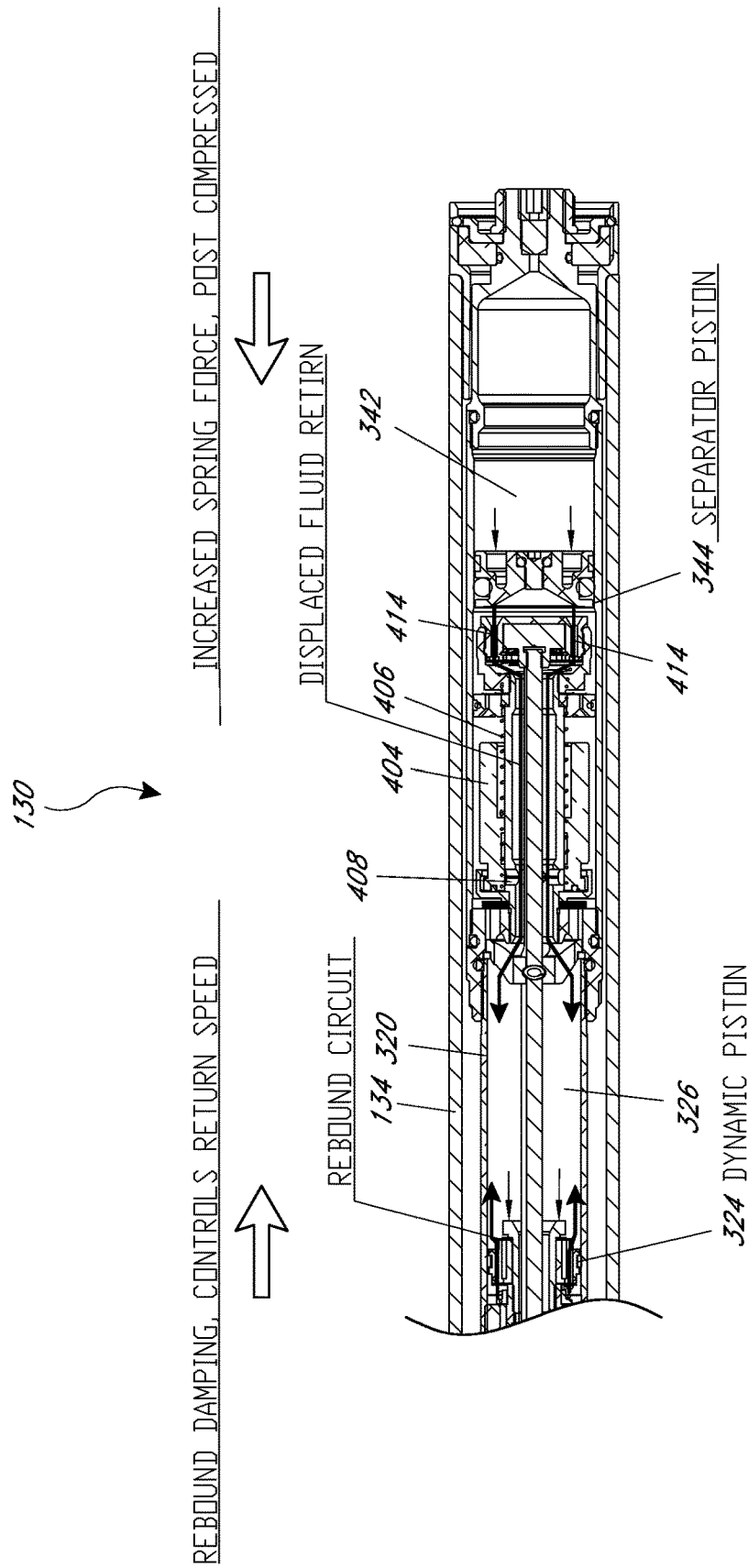
Figure 4D:
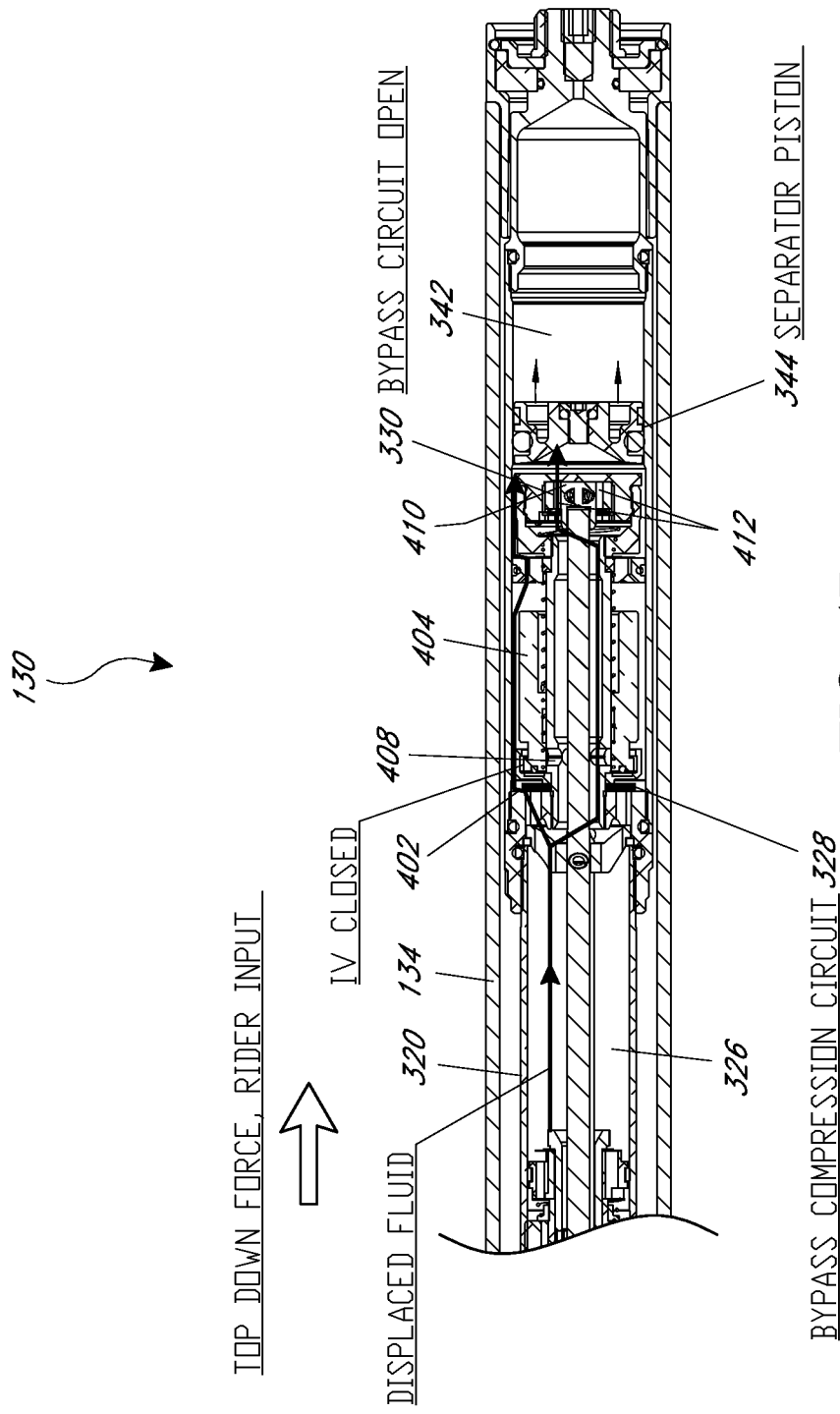

FIG. 4C illustrates a situation or configuration where the saddle post 130 has been compressed, such as after application of the bottom-up and top-down forces from FIG. 4B, and the saddle post 130 is now extending back to the fully extended position or configuration. For example, as a result of the terrain induced bottom-up force and rider induced top-down force shown in FIG. 4B, the saddle may have moved downward with respect to the bicycle frame. FIG. 4C illustrates the configuration wherein the saddle is moved or pushed back upward to its home or fully extended position.

With further reference to FIG. 4C, in this embodiment desirably two different spring forces work together to cause the saddle and/or the upper support 136 to move back upward or to extend into the fully extended position. First, the increased pressure within gas chamber 342 forces separator piston 344 upward, or to the left as oriented in FIG. 4C. This forces fluid through orifices 414 of rebound refill circuit 340 and back into the fluid chamber 326. This also causes the saddle, connected to the upper support 136, to tend to move upward or in the extend direction. Further, the air spring 302, as shown in FIG. 3A, also causes the upper support 136 to extend or move upward with respect to the lower support 134.

It is desirable to control the upward extension of the saddle when the saddle is returning to its home or fully extended position. One reason for this is that a rider could be injured if, for example, the rider had lifted himself or herself off of the saddle before the saddle extended, and the saddle was caused to quickly extend upward or snap upward. Accordingly, it can be desirable to have rebound damping that damps the upward or extend direction movement of the saddle. This rebound damping is controlled by fluid passing through the rebound circuit of the rebound piston 324. As mentioned above, the rebound piston 324 (or a related component) is able to rotate with respect to the damper body 320, with different rotational positions enabling different levels of rebound damping. The rotational position, and thus the level of damping, can be controlled by the rebound adjuster 202, with reference to FIG. 3B.

FIG. 4D illustrates a similar situation to the situation shown in FIG. 4A. For example, in this case, a top-down or rider induced force is being applied to the saddle and thus to the upper support 136. Accordingly, the inertia mass 404 has not moved and is still blocking the orifices 408 and does not enable fluid to pass through the inertia valve circuit. However, in this case, the rotating member 410 of the non-force sensitive bypass mechanism or circuit 330 is in a configuration or position wherein orifices 412 are positioned to enable fluid to pass therethrough from the fluid chamber 326. Accordingly, as a result of the top-down force, fluid is caused to pass from the fluid chamber 326 through the orifices 412 of the bypass circuit 330 and to cause downward (or rightward with reference to the orientation of FIG. 4D) movement of the upper support and the separator piston 344. Further, in the configuration shown in FIG. 4D, the top-down force is also sufficient to open the force-sensitive bypass valve 402 and cause fluid to pass through the force-sensitive bypass compression circuit 328, in addition to through the bypass circuit 330.

Example Spring and Damping Curves

Figure 5A:
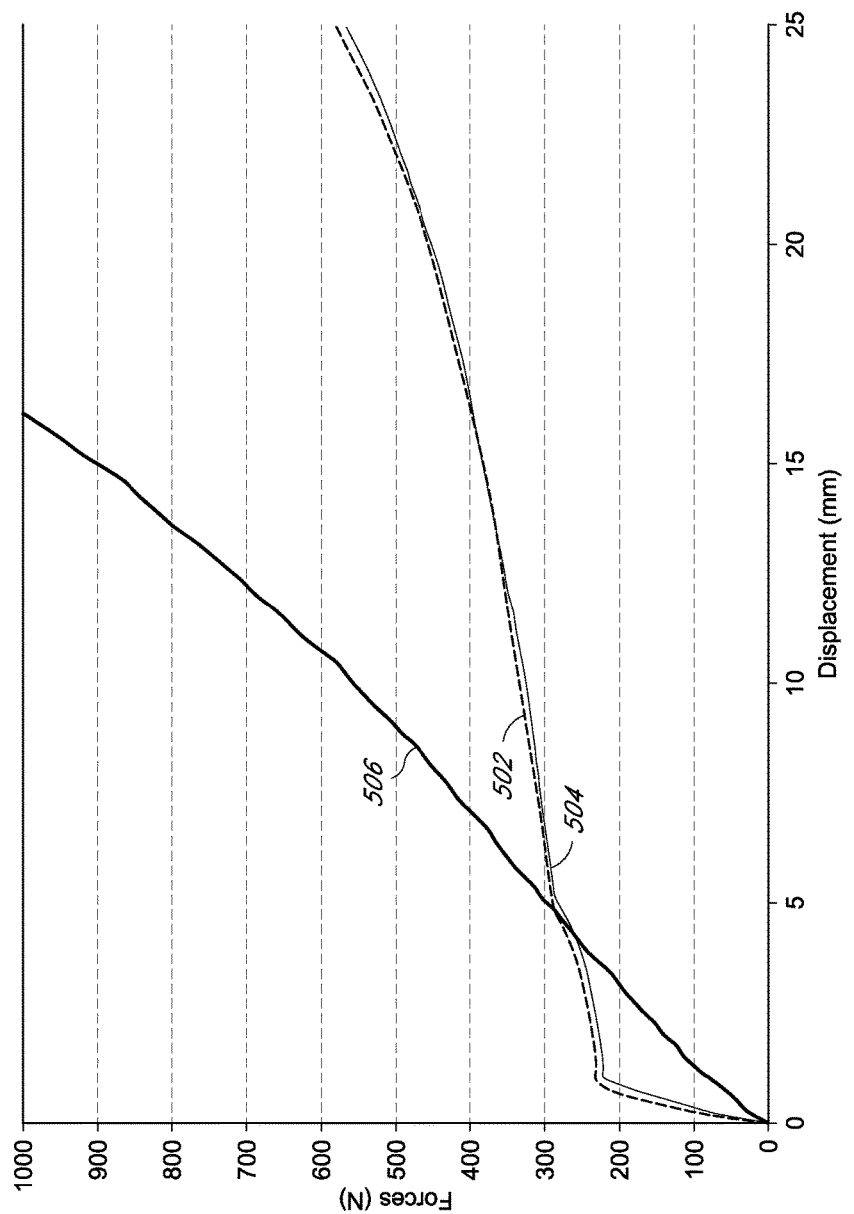
FIGS. 5A and 5B illustrate an example spring curve of an embodiment of a saddle post suspension assembly.
Figure 5B:
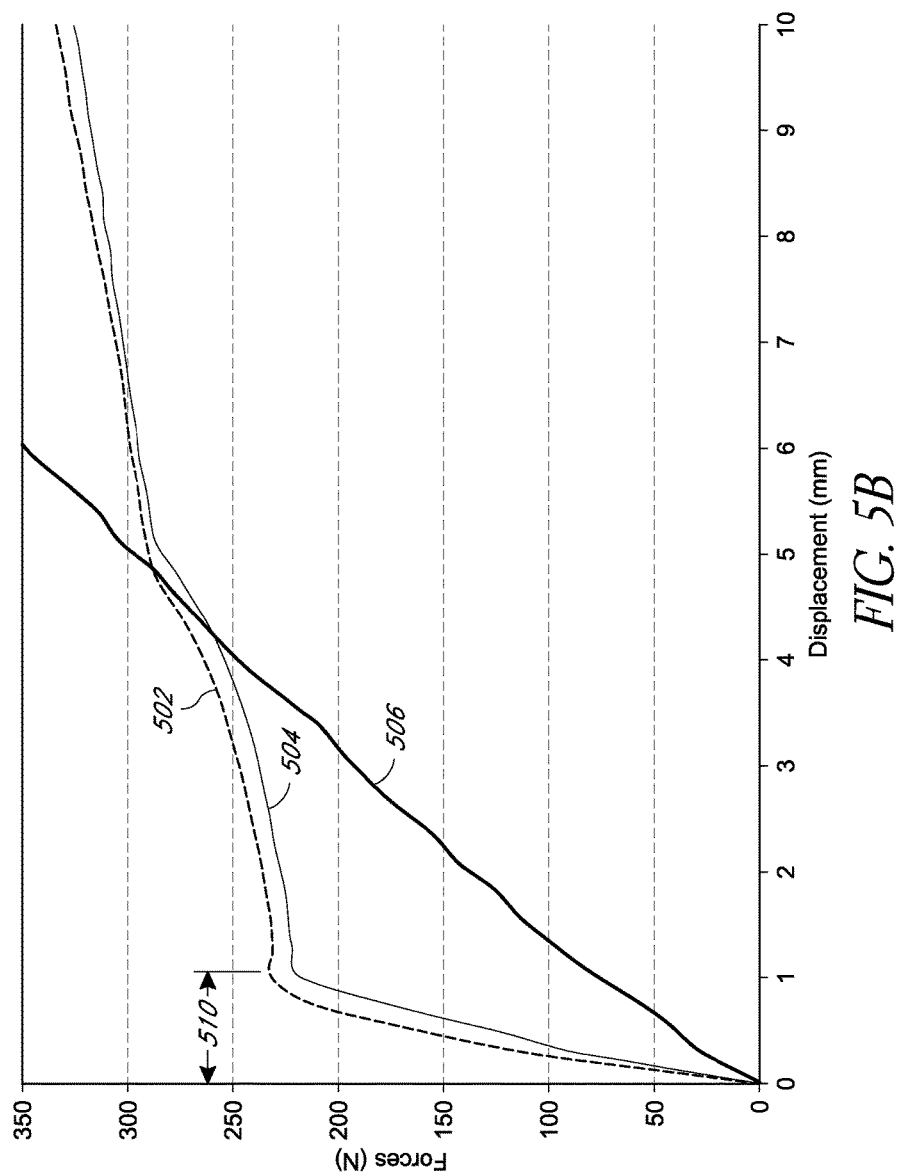

FIGS. 5A and 5B illustrate an example spring curve created from laboratory testing that compares an example compression spring rate of an inertia valve saddle post, such as the saddle post 130 of FIG. 3A, to a conventional spring-based saddle suspension assembly. The conventional spring-based saddle suspension assembly is a linkage-style saddle suspension that uses a spring to support the saddle with respect to the bicycle frame, but comprises no damping mechanism or inertia valve mechanism. FIG. 5A illustrates compression force, in Newtons, versus displacement, in millimeters. FIG. 5B is an enlarged view of the first 10 mm of the total recorded 25 mm of displacement. Lines 502 and 504 illustrate force versus displacement of the inertia valve saddle post. The dashed line 502 illustrates force versus displacement when the inertia valve, such as, for example, the inertia valve 338 of saddle post 130, is closed. The solid line 504 illustrates force versus displacement for an inertia valve saddle post when the inertia valve is open, such as in response to a terrain induced force. Line 506 illustrates force versus displacement for the conventional saddle post suspension.

With further reference to FIGS. 5A and 5B, it can be seen that the spring curves for the inertia valve suspension 502, 504 are flatter than a standard saddle suspension 506 for a majority of the stroke. A small portion 510 of the spring curves of the inertia valve suspension, approximately the first 1 mm of displacement, is steeper than a simple saddle suspension 506. This is due to hysteresis, and/or O-rings settling into glands or grooves, and/or the like. After this first portion 510, the spring rate of the inertia valve saddle post is shallower than the spring rate of a standard saddle suspension. In some embodiments, an inertia valve saddle post may comprise a negative spring, such as is used in various other shock absorbers, which reduces or eliminates the initial setup portion 510.

In the embodiment illustrated in FIGS. 5A and 5B, the inertia valve saddle post is configured to have an average compression spring rate (after the initial setup portion 510, and before a bottoming portion, for example from 33% to 66% of the full stroke, or in some embodiments from 10% to 66% of the full stroke) that is no greater than about 12.5 Newtons per millimeter. In other embodiments, it can be desirable to have a smaller or larger average spring rate. For example, some embodiments may comprise an average spring rate in the above-identified ranges of no greater than approximately 5, 10, 15, 20, 25, 30, 35, 40, 45, or 50 Newtons per millimeter.

An inertia valve suspension saddle post comprises a stroke, wherein a full stroke length comprises a magnitude of linear movement of an upper support (e.g., upper support 136) with respect to a lower support (e.g., lower support 134), from a fully extended position to a fully retracted position, and/or from the fully retracted position to the fully extended position. In some embodiments, this full stroke length is configured to be at least 25, 27.5, or 30 millimeters. One advantage of using an inertia valve suspension saddle post as opposed to a conventional saddle suspension is that a rider may be able to use the entire stroke length (e.g., 100% of the full stroke length or, in some embodiments, at least about 75%, 80%, 85%, 90%, or 95% of the full stroke length). As can be seen in FIG. 5A, at 25 millimeters of displacement (e.g., compression, or downward movement of the saddle), the inertia valve saddle post provides a reaction force of under 600 Newtons. The conventional saddle suspension, on the other hand, is off the chart, but appears to be somewhere in the range of 2,000 Newtons. A rider would likely never be able to provide such a high force (or may injure himself or herself or even damage the bicycle upon applying such a force) to use the entire stroke of a conventional saddle suspension (even if the conventional saddle suspension is mechanically able to have a displacement or stroke length of at least 25 millimeters). The inertia valve saddle post, on the other hand, due to its flatter or shallower spring curve, may enable a rider to use the full stroke length. In some embodiments, the inertia valve saddle post is configured to bottom out at the end of its stroke (e.g., when reaching the fully retracted position) in response to an applied force of approximately 900 to 1,000 Newtons. The conventional saddle suspension would only have compressed by about 15-16 millimeters at that point, significantly less than the full stroke length of the inertia valve saddle post.

In some embodiments, an inertia valve saddle post is configured to generate a compression reaction force that varies by no more than about 110 Newtons in a range from 33% to 66% of a full compression stroke. In other embodiments, it can be desirable to have a smaller or larger variance, such as, for example, no greater than approximately 10, 20, 30, 40, 50, 60, 70, 80, 90, 100, 120, 130, 140, 150, 160, 170, 180, 190, or 200 Newtons. In some embodiments, an inertia valve saddle post is configured to generate a compression reaction force at 66% of a full compression stroke length that is no greater than about 1.3 times the compression reaction force generated at 33% of a full compression stroke length. In other embodiments, it can be desirable to have a smaller or larger ratio, such as, for example, no greater than approximately 1.1, 1.2, 1.4, 1.5, 1.6, 1.7, 1.8, 1.9, or 2.0.

With further reference to FIGS. 5A and 5B, another desirable feature of the inertia valve saddle post disclosed herein is that sag can be minimal and significantly smaller than with a standard saddle suspension. For example, if an average rider weighs approximately 180 pounds, it can be assumed that a holdup force or sag setting at about 200 Newtons (e.g., 45 pounds) may be used. As can be seen in FIG. 5B, a 200 Newton holdup force with the inertia valve seat post 502, 504 will result in less than 1 mm of downward displacement of the saddle. On the other hand, the same 200 Newton holdup force with a conventional saddle suspension 506 will cause the saddle to displace by over 3 mm, at least three times as much. As discussed above with reference to dimension 150 of FIG. 1B, and in the related references, such as *Andy Pruitt's Complete Medical Guide for Cyclists*, the distance between the saddle and pedals can be quite important for maximizing rider efficiency. Accordingly, even this 3 mm displacement, which is three times the displacement of the inertia valve seat post, can have a negative effect on rider efficiency.

A typical event, such as a terrain induced bump, may be approximately 100 Newtons. In other words, if an average rider is applying a 200 Newton downward force to the saddle due to just the holdup force of the rider, and the rider hits a bump in a trail, the total compression force within the inertia valve seat post may be approximately 300 Newtons, with 200 Newtons of that induced by the rider, and 100 Newtons induced by the terrain. As can be seen in FIG. 5B, the inertia valve seat post desirably allows significantly more downward displacement of the saddle in response to this 100 Newton event than a conventional saddle suspension. For example, with reference to FIG. 5B, moving from 200 Newtons to 300 Newtons on the inertia valve curves 502, 504 results in approximately 5 mm of additional downward displacement of the saddle. With the conventional saddle suspension 506, on the other hand, the same 200 to 300 Newton change results in only approximately 2 millimeters of additional downward displacement of the saddle. As the force increases, the relative difference in displacement of the inertia valve saddle post versus the conventional saddle suspension also increases.

In some embodiments, it is desirable to have the flatter spring curve characteristics of the inertia valve saddle post to enable an increased amount of downward motion of the saddle in response to a bump on the trail. One way to achieve this, as mentioned above, is to configure the inertia valve saddle post assembly to have relatively low damping characteristics.

In some embodiments, it can be desirable to configure a saddle suspension to have differing spring curve characteristics depending on the applied load (as opposed to a typical saddle suspension, which has a spring curve with substantially the same slope throughout its stroke length). For example, as can be seen in FIG. 5B, portion 510 at the left end of spring curves 502, 504 is significantly steeper than the rest of the spring curves 502, 504. This steeper portion at lower loads (in this case up to about 220-230 Newtons) can be desirable to, among other things, enable limited or relatively little compression movement in response to a normal rider holdup force (e.g., the 1 mm downward displacement discussed above), but to enable greater movement (e.g., a flatter spring curve) in response to compression forces applied above the typical rider holdup force. Although in this embodiment, the transition from a steeper curve to a shallower or flatter curve occurs at about 220-230 Newtons, other embodiments may have this transition at a higher or lower force, such as, for example, about 100, 110, 120, 130, 140, 150, 160, 170, 180, 190, 200, 210, 240, 250, 260, 270, 280, 290, or 300 Newtons. Having a steeper spring curve at lower loads (for example, up to about a rider holdup force) can also make a saddle suspension easier to setup (for example, when setting initial sag), because the saddle will remain at the same position, or move relatively little, whether the rider is on or off of a stationary bicycle.

Figure 6:
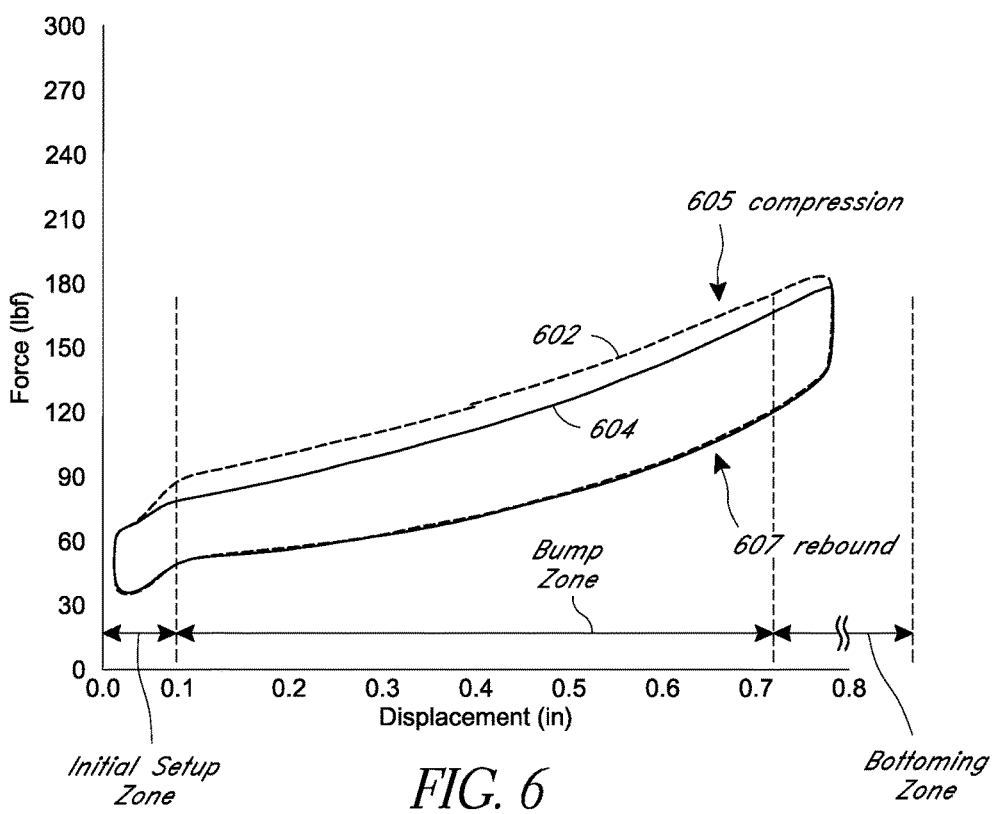
FIG. 6 illustrates an example damping curve of an embodiment of a saddle post suspension assembly.

FIG. 6 illustrates a damping curve of an embodiment of an inertia valve saddle post, such as the inertia valve saddle post 130 described above. The damping curve illustrated in FIG. 6 comprises compression of the saddle post from the fully extended position to approximately 0.786 inches compressed, and then a rebound back to the fully extended position. The damping curves in FIG. 6 were generated when moving the saddle at a velocity of approximately 0.76 in./s in the downward direction and approximately 0.68 in./s in the upward or rebound direction. The dashed line 602 illustrates the damping curve with the inertia valve closed, and the solid line 604 illustrates the damping curve with the inertia valve open. The top portion of the graph 605 is the compression stroke, and the bottom portion 607 is the rebound stroke.

With further reference to FIG. 6, the inertia valve saddle post comprises three main regions of damping and spring rates. The first region is the initial setup zone, the second is the bump zone, and the third is the bottoming zone. The graph of FIG. 6 illustrates the initial setup zone and the bump zone fully, but only shows the beginning of the bottoming zone (e.g., the saddle post was not compressed all the way to its fully bottomed out position during the test). In a typical shock absorber, the initial setup zone, bump zone, and bottoming zone each comprise roughly ⅓ of the stroke of the shock absorber. One reason for a typical shock absorber having such an initial setup zone is that a typical shock absorber is setup with a significant amount of sag, to allow room to re-expand when, for example, a wheel moves over a hole or other void in a road or trail and needs to move downward without causing the whole bicycle to move downward. Desirably, a saddle post, however, will have zero sag or relatively little sag, because it may not be desired to have the saddle extend upward if the rider removes his or her weight from the saddle. Accordingly, it can be desirable to have a relatively small initial setup zone with an inertia valve saddle post, and a relatively larger bump zone. Accordingly, the bump zone comprises the majority of the graph of FIG. 6. The bottoming zone, which is not fully shown, comprises an increasing spring rate to avoid a harsh bottoming at the end of the stroke.

Figure 7:
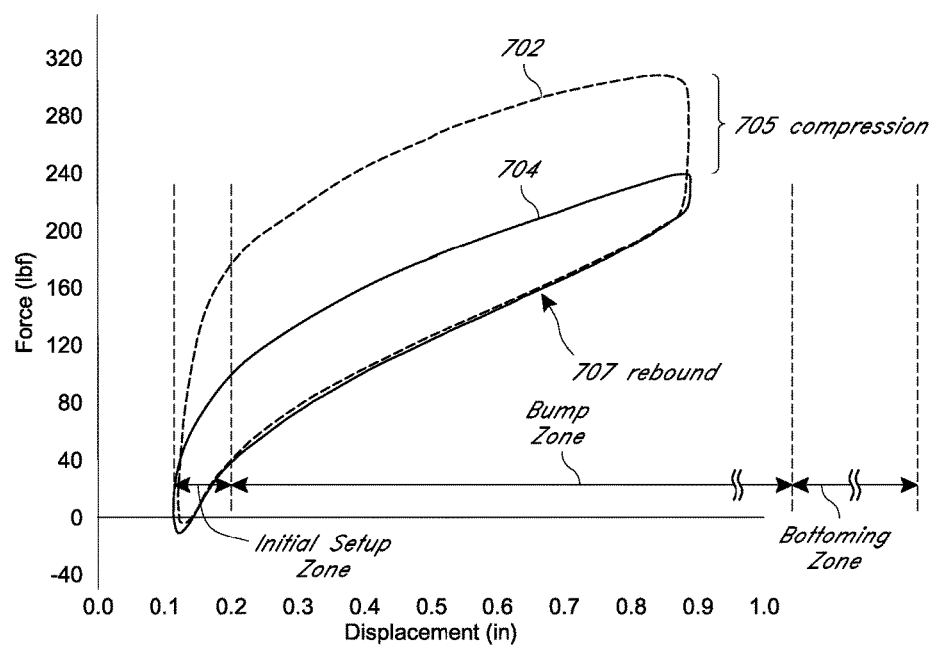
FIG. 7 illustrates an example damping curve of an embodiment of a fork suspension assembly.

For comparison with an inertia valve saddle post, FIG. 7 illustrates an example damping curve of a front fork inertia valve shock absorber. The example graph shown in FIG. 7 comprises a compression portion 705 and a rebound portion 707. The dashed line 702 is with the inertia valve closed, and the solid line 704 is with the inertia valve open. These curves were created with a total stroke of approximately 0.782 inches, a compression velocity of approximately 0.76 in./s, and a rebound velocity of approximately 0.68 in./s.

As can be seen by comparing FIG. 6 to FIG. 7, the fork suspension comprises a greater compression damping difference between the inertia valve being open and closed than the inertia valve seat post. One reason for this is that, as mentioned above, and inertia valve seat post is desirably configured to comprise relatively low damping to, among other things, make the inertia valve more sensitive to a terrain induced force that is applied to a wheel that is spaced away from the axis of the inertia valve seat post. With the fork shock absorber of FIG. 7, closing the inertia valve adds approximately 80 pounds of force to the force versus displacement curve. With the inertia valve saddle post of FIG. 6, on the other hand, closing the inertia valve adds only approximately 15 pounds of force to the force versus displacement curve. The graph shown in FIG. 7 shows the initial setup zone and a portion of the bump zone of the fork shock. However, the remainder of the bump zone and the bottoming zone are not shown in this graph.

Although the embodiment of an inertia valve saddle post suspension tested as shown in FIG. 6 is configured to add approximately 15 pounds of force to the force versus displacement curve when the inertia valve is closed versus when the inertia valve is open (when compressing at a rate of approximately 0.76 in./s), in other embodiments, the additional force may be no more than approximately 5, 10, 20, 25, 30, 35, 40, 45, 50, 55, 60, 65, 70, or 75 pounds. As described in further detail below with reference to FIG. 8, this additional force, generated by the damping portion of the saddle post suspension (as opposed to the air spring portion), can have a significant effect on rider comfort and efficiency, because the additional damping can reduce or eliminate oscillations of the saddle while the rider is riding the bicycle.

Figure 8:
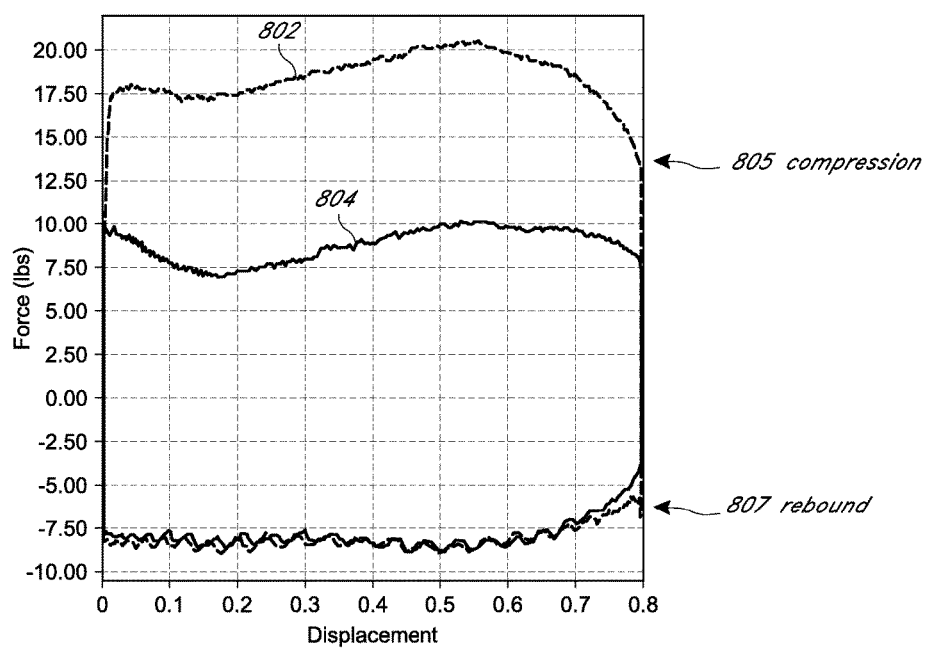
FIG. 8 illustrates another example damping curve of an embodiment of a saddle post suspension assembly.

FIG. 8 illustrates another example embodiment of a damping curve of a saddle post suspension assembly, such as, for example, the inertia valve saddle post 130 described above. One difference between the curves of FIG. 8 and the curves of FIGS. 5A, 5B, and 6 is that the testing performed to generate the curves of FIG. 8 was performed without the air spring installed. Accordingly, the force values illustrated in FIG. 8 are indicative substantially or wholly of damping forces generated by the damping portion of the saddle post suspension (e.g., damper cartridge 304 shown in FIG. 3A). The force values illustrated in FIGS. 5A, 5B, and 6, on the other hand, are a combination of at least the damping forces generated by the damping portion (e.g., damper cartridge 304 shown in FIG. 3A) and the air spring portion (e.g., air spring 302 shown in FIG. 3A).

A top portion 805 of FIG. 8 illustrates a damping resistive force during compression (e.g., saddle moving downward with respect to the bicycle frame), and a bottom portion 807 illustrates a damping resistive force during rebound (e.g., saddle moving upward with respect to the bicycle frame). The dashed curve 802 corresponds with a damping force when the inertia valve is closed. The solid curve 804 corresponds with a damping force when the inertia valve is open. It can be seen that in the compression stroke 805, the damping force is approximately doubled when the inertia valve is closed as opposed to when the inertia valve is open. This can be a desirable configuration, particularly in a bicycle configuration where the saddle post's air spring is configured such that the air spring provides just enough force to support a rider at a particular position, but would experience undesirable oscillations without sufficient damping during riding. Accordingly, the saddle post suspension assembly is desirably configured such that, when the inertia valve is closed, sufficient damping is present to reduce or eliminate these oscillations. When a terrain bump occurs, and the inertia valve opens, the damping is desirably reduced to enable the saddle post to absorb a greater amount of the impact (e.g., by decreasing resistance to saddle drop with respect to the bicycle frame).

In some embodiments, the damping force provided by an inertia valve saddle post suspension (e.g., by only the damping portion, not including any air spring portion) when the inertia valve is open is configured to be approximately half or 50% of when the inertia valve is closed. In other embodiments, however, various other ratios may be desirable. For example, a ratio of damping force with the inertia valve open to damping force with the inertia valve closed may be, for example, in some embodiments, 10%, 20%, 30%, 40%, 60%, or 70%. Regarding absolute values, in some embodiments, it can be desirable to have average compression damping forces (e.g., by only the damping portion, not including any air spring portion) of approximately 19 pounds with the inertia valve closed and approximately 9 pounds with the inertia valve open. In other embodiments, however, it may be desirable to have higher or lower damping forces, such as, for example, 10, 15, 20, 25, 30, 35, 40, 45, or 50 pounds with the inertia valve closed, and 0, 1, 2, 3, 4, 5, 6, 7, 8, 10, 11, 12, 13, 14, 15, 16, 17, 18, 19, 20, 21, 22, 23, 24, or 25 pounds with the inertia valve open. In some embodiments, the damping force numbers recited herein with respect to FIG. 8 are given with an assumed downward or compression velocity of the saddle of approximately 0.76 in./s. Such a velocity may be relatively typical during certain terrain events. However, the concepts and numerical amounts disclosed herein may also be applicable to various other situations where the compression or downward velocity is lower or higher. For example, the numerical amounts discussed above may be applicable in a situation where the downward compression velocity is, for example, approximately 0.5, 0.6, 0.7, 0.8, 0.9, or 1.0 in./s.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, as further discussed above, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

In describing the present technology, the following terminology may have been used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects, and advantages are necessarily required to practice the present invention. Accordingly, the scope of the present invention is intended to be defined only by the claims that follow.

What is claimed is:

1. A bicycle saddle suspension assembly comprising:
   a body configured to couple to a bicycle frame;
   a saddle support mechanism configured to couple to a bicycle saddle, the saddle support mechanism movable in first and second directions with respect to the body;
   a suspension spring that biases the saddle support mechanism in the first direction with respect to the body; and
   a damping apparatus configured to damp motion of the saddle support mechanism with respect to the body, the damping apparatus comprising:
      an inertia mass configured to have open and closed positions, wherein in the open position, the inertia mass permits a flow of damping fluid through an orifice, and, in the closed position, the inertia mass reduces said flow of said damping fluid through the orifice; and
      a biasing spring that biases the inertia mass to the closed position,
      wherein the inertia mass and biasing spring are configured to enable the inertia mass to move toward the open position in response to an acceleration of the body toward the saddle support mechanism caused by an externally-applied force above a predetermined threshold, and wherein the inertia mass and biasing spring are configured to retain the inertia mass in the closed position in response to an acceleration of the body caused by a rider-induced force applied to the bicycle saddle.

2. The suspension assembly of claim 1, further comprising a linkage mechanism that couples the saddle support mechanism to the body.

3. The suspension assembly of claim 1, further comprising a support tube coupled to the saddle support mechanism, the support tube slidably coupled to the body.

4. The suspension assembly of claim 1, wherein the first direction is away from the body and the second direction is toward the body.

5. The suspension assembly of claim 1, wherein the first direction is opposite the second direction.

6. The suspension assembly of claim 1, wherein the inertia mass is configured to slide in the first and second directions with respect to the body.

7. The suspension assembly of claim 1, wherein the suspension spring comprises an air spring.

8. The suspension assembly of claim 1, wherein the damping apparatus is configured to generate a damping force that is no more than 15 pounds greater with the inertia mass in the closed position than with the inertia mass in the open position when the saddle support mechanism is moving in the second direction at a rate of 0.760 inches per second.

9. The suspension assembly of claim 1, wherein the damping apparatus is configured to generate a damping force that is no more than 25 pounds greater with the inertia mass in the closed position than with the inertia mass in the open position when the saddle support mechanism is moving in the second direction at a rate of 0.760 inches per second.

10. The suspension assembly of claim 1, wherein the damping apparatus is configured to generate a damping force that is no more than 50 pounds greater with the inertia mass in the closed position than with the inertia mass in the open position when the saddle support mechanism is moving in the second direction at a rate of 0.760 inches per second.

11. The suspension assembly of claim 1, wherein the suspension spring comprises a nonlinear spring rate.

12. The suspension assembly of claim 1, wherein a full stroke of the saddle support mechanism comprises a range from a fully extended position in the first direction to a fully retracted position in the second direction with respect to the body, and wherein an average spring rate of the suspension spring is configured to be no greater than 12.5 Newtons per millimeter from 33% to 66% of the full stroke when the saddle support mechanism is moving in the second direction.

13. The suspension assembly of claim 1, wherein a full stroke of the saddle support mechanism comprises a range from a fully extended position in the first direction to a fully retracted position in the second direction with respect to the body, and wherein an average spring rate of the suspension spring is configured to be no greater than 12.5 Newtons per millimeter from 10% to 66% of the full stroke when the saddle support mechanism is moving in the second direction.

14. The suspension assembly of claim 1, wherein a full stroke of the saddle support mechanism comprises a range from a fully extended position in the first direction to a fully retracted position in the second direction with respect to the body, and wherein a reaction force generated by the suspension spring is configured to vary by no more than 110 Newtons from 33% to 66% of the full stroke when the saddle support mechanism is moving in the second direction.

15. The suspension assembly of claim 1, wherein a full stroke of the saddle support mechanism from a fully extended position in the first direction to a fully retracted position in the second direction comprises at least 25 millimeters.

16. A bicycle assembly comprising:
a bicycle frame;
a wheel rotatably coupled to the frame;
a bicycle saddle coupled to the frame and movable in extend and retract directions with respect to the frame;
a suspension spring that biases the saddle in the extend direction with respect to the frame; and
a damping apparatus configured to damp motion of the saddle with respect to the frame, the damping apparatus comprising:
an inertia mass configured to have open and closed positions, wherein in the open position, the inertia mass permits a flow of damping fluid through an orifice, and, in the closed position, the inertia mass reduces said flow of said damping fluid through the orifice; and
a biasing spring that biases the inertia mass to the closed position,
wherein the inertia mass and biasing spring are configured to enable the inertia mass to move toward the open position in response to a terrain-induced force above a predetermined threshold applied to the wheel, and
wherein the inertia mass and biasing spring are configured to retain the inertia mass in the closed position in response to a rider-induced force applied to the saddle.

17. The bicycle assembly of claim 16, wherein the bicycle saddle is coupled to the frame using a linkage mechanism.

18. The bicycle assembly of claim 16, wherein the bicycle saddle is coupled to the frame using a tubular support that is configured to slide in the extend and retract directions with respect to the frame.

19. The bicycle assembly of claim 16, wherein the inertia mass is configured to translate in the extend and retract directions with respect to the frame.

20. The bicycle assembly of claim 16, wherein the inertia mass and saddle are configured to translate collinearly along a longitudinal axis of a saddle post.

21. The bicycle assembly of claim 16, wherein the suspension spring comprises an air spring.

22. The bicycle assembly of claim 16, wherein the damping apparatus is configured to generate a damping force that is no more than 15 pounds greater with the inertia mass in the closed position than with the inertia mass in the open position when the saddle is moving in the retract direction at a rate of 0.760 inches per second.

23. The bicycle assembly of claim 16, wherein the damping apparatus is configured to generate a damping force that is no more than 25 pounds greater with the inertia mass in the closed position than with the inertia mass in the open position when the saddle is moving in the retract direction at a rate of 0.760 inches per second.

24. The bicycle assembly of claim 16, wherein the damping apparatus is configured to generate a damping force that is no more than 50 pounds greater with the inertia mass in the closed position than with the inertia mass in the open position when the saddle is moving in the retract direction at a rate of 0.760 inches per second.

25. The bicycle assembly of claim 16, wherein the suspension spring comprises a nonlinear spring rate.

26. The bicycle assembly of claim 16, wherein a full stroke of the saddle comprises a range from a fully extended position in the extend direction to a fully retracted position in the retract direction with respect to the frame, and wherein an average spring rate of the suspension spring is configured to be no greater than 12.5 Newtons per millimeter from 33% to 66% of the full stroke when the saddle is moving in the retract direction.

27. The bicycle assembly of claim 16, wherein a full stroke of the saddle comprises a range from a fully extended position in the extend direction to a fully retracted position in the retract direction with respect to the frame, and wherein an average spring rate of the suspension spring is configured to be no greater than 12.5 Newtons per millimeter from 10% to 66% of the full stroke when the saddle is moving in the retract direction.

28. The bicycle assembly of claim 16, wherein a full stroke of the saddle comprises a range from a fully extended position in the extend direction to a fully retracted position in the retract direction with respect to the frame, and wherein a reaction force generated by the suspension spring is configured to vary by no more than 110 Newtons from 33% to 66% of the full stroke when the saddle is moving in the retract direction.

29. The bicycle assembly of claim 16, wherein a full stroke of the saddle from a fully extended position in the extend direction to a fully retracted position in the retract direction comprises at least 25 millimeters.

30. A bicycle saddle suspension assembly comprising:
a first support configured to attach to or form part of a bicycle frame;
a second support slidably coupled to the first support such that the second support can slide in extend and retract directions with respect to the first support, a distal end of the second support being configured to attach to a bicycle saddle;
a suspension spring that biases the second support in the extend direction with respect to the first support; and
a damping apparatus configured to damp motion of the second support with respect to the first support, the damping apparatus comprising:
an inertia mass configured to have open and closed positions, wherein in the open position, the inertia mass permits a flow of damping fluid through an orifice, and, in the closed position, the inertia mass reduces said flow of said damping fluid through the orifice; and
a biasing spring that biases the inertia mass to the closed position,
wherein the inertia mass and biasing spring are configured to enable the inertia mass to move toward the open position in response to acceleration of the first support in a direction toward the distal end of the second support, and
wherein the inertia mass and biasing spring are configured to retain the inertia mass in the closed position in response to acceleration of the first support caused by a rider-induced force applied to the bicycle saddle.

31. The bicycle saddle suspension assembly of claim 30, wherein the inertia mass is disposed at least partially within a cavity of the first support.

32. The bicycle saddle suspension assembly of claim 30, wherein the inertia mass and second support comprise collinear longitudinal axes.

33. The bicycle saddle suspension assembly of claim 30, wherein the suspension spring comprises an air spring disposed at least partially within a cavity of the first support.

34. The bicycle saddle suspension assembly of claim 30, wherein the damping apparatus is configured to generate a damping force that is no more than 15 pounds greater with the inertia mass in the closed position than with the inertia mass in the open position when the second support is moving in the retract direction at a rate of 0.760 inches per second.

35. The bicycle saddle suspension assembly of claim 30, wherein the damping apparatus is configured to generate a damping force that is no more than 25 pounds greater with the inertia mass in the closed position than with the inertia mass in the open position when the second support is moving in the retract direction at a rate of 0.760 inches per second.

36. The bicycle saddle suspension assembly of claim 30, wherein the damping apparatus is configured to generate a damping force that is no more than 50 pounds greater with the inertia mass in the closed position than with the inertia mass in the open position when the second support is moving in the retract direction at a rate of 0.760 inches per second.

37. The bicycle saddle suspension assembly of claim 30, wherein the suspension spring comprises a nonlinear spring rate.

38. The bicycle saddle suspension assembly of claim 30, wherein a full stroke of the second support comprises a range from a fully extended position in the extend direction to a fully retracted position in the retract direction with respect to the first support, and wherein an average spring rate of the suspension spring is configured to be no greater than 12.5 Newtons per millimeter from 33% to 66% of the full stroke when the second support is moving in the retract direction.

39. The bicycle saddle suspension assembly of claim 30, wherein a full stroke of the second support comprises a range from a fully extended position in the extend direction to a fully retracted position in the retract direction with respect to the first support, and wherein an average spring rate of the suspension spring is configured to be no greater than 12.5 Newtons per millimeter from 10% to 66% of the full stroke when the second support is moving in the retract direction.

40. The bicycle saddle suspension assembly of claim 30, wherein a full stroke of the second support comprises a range from a fully extended position in the extend direction to a fully retracted position in the retract direction with respect to the first support, and wherein a reaction force generated by the suspension spring is configured to vary by no more than 110 Newtons from 33% to 66% of the full stroke when the second support is moving in the retract direction.

41. The bicycle saddle suspension assembly of claim 30, wherein a full stroke of the second support mechanism from a fully extended position in the extend direction to a fully retracted position in the retract direction comprises at least 25 millimeters.

* * * * *